US009582531B2

(12) United States Patent
Tomkins

(10) Patent No.: US 9,582,531 B2
(45) Date of Patent: Feb. 28, 2017

(54) SYSTEM AND METHOD OF CONCLUSIVELY VERIFYING THE CORRECTNESS OF AN INFORMATION SYSTEM WITHOUT NEEDING TO TEST EVERY COMBINATION OF BEHAVIOR AT RUN-TIME

(71) Applicant: Paul Leslie Tomkins, New Milton (GB)

(72) Inventor: Paul Leslie Tomkins, New Milton (GB)

( * ) Notice: Subject to any disclaimer, the term of this patent is extended or adjusted under 35 U.S.C. 154(b) by 631 days.

(21) Appl. No.: 14/062,306

(22) Filed: Oct. 24, 2013

(65) Prior Publication Data

US 2014/0156617 A1 Jun. 5, 2014

Related U.S. Application Data

(63) Continuation of application No. 12/520,274, filed as application No. PCT/GB2008/000296 on Jan. 30, 2008, now abandoned.

(51) Int. Cl.
*G06F 17/30* (2006.01)
*G06F 9/44* (2006.01)

(52) U.S. Cl.
CPC .......... *G06F 17/30371* (2013.01); *G06F 8/20* (2013.01)

(58) Field of Classification Search
USPC ........................ 707/793, 610, 792, 79, 803
See application file for complete search history.

(56) References Cited

U.S. PATENT DOCUMENTS

| 4,931,928 | A * | 6/1990 | Greenfeld | G06F 8/427 |
| | | | | 707/999.003 |
| 6,212,673 | B1 * | 4/2001 | House | G06F 3/0482 |
| | | | | 707/E17.005 |
| 6,263,498 | B1 * | 7/2001 | Alcorn | G06F 9/465 |
| | | | | 717/110 |
| 6,330,007 | B1 * | 12/2001 | Isreal | G06F 3/0481 |
| | | | | 715/207 |
| 7,257,579 | B2 * | 8/2007 | Wachholz-Prill | G06Q 10/06 |
| 7,603,358 | B1 * | 10/2009 | Anderson | G06F 17/30554 |
| 7,725,501 | B1 * | 5/2010 | Stillman | G06F 17/30607 |
| | | | | 707/793 |
| 7,860,827 | B1 * | 12/2010 | Ayyad | G06F 17/30578 |
| | | | | 707/610 |

(Continued)

OTHER PUBLICATIONS

Butleris et al., "Metadata for Business Rules Integration with Database Schema," 2005, IADIS Virtual Multi Conference and Information Systems, pp. 263-270.

*Primary Examiner* — Sana Al Hashemi
(74) *Attorney, Agent, or Firm* — Price Heneveld LLP

(57) ABSTRACT

An architecture for the initial development and later adaptation of systems comprising a database, one or more client or user-interface programs whose system data, application data and rule data are stored in the database alongside the content. A framework in the database stores system, application and rule data and frameworks in the user-interface and client programs load the system, application and rule data to generate objects and, in doing so, define an application-specific system. Data integrity checks of the system data, application data and rule data using triggers and/or stored procedures ensure the correctness of the system without having to test every combination of behavior at run-time.

10 Claims, 60 Drawing Sheets

(56) References Cited

U.S. PATENT DOCUMENTS

| | | | |
|---|---|---|---|
| 7,925,513 B2* | 4/2011 | Chao | G06Q 10/06 705/26.1 |
| 2005/0204340 A1* | 9/2005 | Ruminer | G06F 8/70 717/123 |
| 2008/0141237 A1* | 6/2008 | Elad | G06F 8/67 717/171 |

* cited by examiner

| RDB$RELATION_NAME |
| --- |
| SYS_FUNCTION_ARGUMENT |
| SYS_FUNCTION_DEFINITION |
| SYS_FUNCTION_INSTANCE |
| SYS_FUNCTION_PARAMETER |
| SYS_PAPER_SIZE |
| SYS_POP3 |
| SYS_PUBLIC_KEY |
| SYS_RECORD |
| SYS_REFERENCE |
| SYS_REPLICA |
| SYS_SELECT |
| SYS_SMTP |
| SYS_STATEMENT |
| SYS_STYLE |
| SYS_SUBPROCEDURE |
| SYS_SYNCHRONIZE |
| SYS_SYSTEM |
| SYS_TABLE |
| SYS_TEST |
| SYS_TOOL_BAR |
| SYS_TOOL_WIDGET |
| SYS_USER |
| SYS_VARIABLE |
| SYS_VIEW |
| SYS_VIEW_LINK |
| SYS_VIEW_OBJECT |
| SYS_WIDGET |
| SYS_WIDGET_TYPE |

FIG. 2A

| RDB$FIELD_NAME | RDB$RELATION_NAME |
| --- | --- |
| SYS_IDENTITY | SYS_TABLE |
| SYS_NAME | SYS_TABLE |
| SYS_IS_SIMULATED | SYS_TABLE |
| SYS_IS_SYSTEM | SYS_TABLE |
| SYS_PRIMARY_KEY | SYS_TABLE |
| SYS_SYSTEM_UUID | SYS_TABLE |
| SYS_BEFORE_INSERT | SYS_TABLE |
| SYS_AFTER_INSERT | SYS_TABLE |
| SYS_BEFORE_UPDATE | SYS_TABLE |
| SYS_AFTER_UPDATE | SYS_TABLE |
| SYS_BEFORE_DELETE | SYS_TABLE |
| SYS_AFTER_DELETE | SYS_TABLE |
| SYS_INSERT_TRANSACTION | SYS_TABLE |
| SYS_INSERT_REPLICA | SYS_TABLE |
| SYS_INSERT_STAMP | SYS_TABLE |
| SYS_INSERT_USER | SYS_TABLE |
| SYS_UPDATE_TRANSACTION | SYS_TABLE |
| SYS_UPDATE_REPLICA | SYS_TABLE |
| SYS_UPDATE_STAMP | SYS_TABLE |
| SYS_UPDATE_USER | SYS_TABLE |
| SYS_REPLICA_UUID | SYS_TABLE |
| SYS_IDENTITY | SYS_TEST |
| SYS_CONDITION | SYS_TEST |
| SYS_SUBCONDITION | SYS_TEST |
| SYS_SUBFUNCTION | SYS_TEST |
| SYS_SEQUENCE | SYS_TEST |
| SYS_INSERT_TRANSACTION | SYS_TEST |
| SYS_INSERT_REPLICA | SYS_TEST |

FIG. 2B

| RDB$FIELD_NAME | RDB$FIELD_LENGTH | RDB$FIELD_SCALE | RDB$FIELD_TYPE | RDB$FIELD_SUB_TYPE | RDB$CHARACTER_SET_ID |
|---|---|---|---|---|---|
| DOM_BOOLEAN | 2 | 0 | 7 | 0 <null> | |
| DOM_CAPTION | 50 | 0 | 37 | 0 | 2 |
| DOM_CERTIFICATE | 8 | 0 | 261 | 1 | 2 |
| DOM_CHAR | 252 | 0 | 14 | 0 | 2 |
| DOM_CHAR32 | 32765 | 0 | 14 | 0 | 2 |
| DOM_CLASS | 31 | 0 | 14 | 0 | 2 |
| DOM_CLOB | 8 | 0 | 261 | 1 | 2 |
| DOM_DATE | 9 | 0 | 14 | 0 | 2 |
| DOM_DATETIME | 24 | 0 | 14 | 0 | 2 |
| DOM_DATETIME_PERIOD | 8 | 0 | 16 | 0 <null> | |
| DOM_DATE_PERIOD | 4 | 0 | 8 | 0 <null> | |
| DOM_DEFINITION | 8 | 0 | 261 | 1 | 2 |
| DOM_DESCRIPTION | 8 | 0 | 261 | 1 | 2 |
| DOM_DOUBLE | 8 | 0 | 27 <null> | <null> | |
| DOM_ENUMERATION | 2 | 0 | 7 | 0 <null> | |
| DOM_EVENT | 23 | 0 | 14 | 0 | 2 |
| DOM_FILE | 31 | 0 | 14 | 0 | 2 |
| DOM_FLAG | 1 | 0 | 14 | 0 | 2 |
| DOM_FLOAT | 4 | 0 | 10 <null> | <null> | |
| DOM_IDENTITY | 8 | 0 | 16 | 0 <null> | |
| DOM_INTEGER | 4 | 0 | 8 | 0 <null> | |
| DOM_NAME | 50 | 0 | 37 | 0 | 2 |
| DOM_OBJECT | 31 | 0 | 14 | 0 | 2 |
| DOM_PASSWORD | 31 | 0 | 14 | 0 | 2 |
| DOM_PATH | 32765 | 0 | 37 | 0 | 2 |
| DOM_PREFERENCE | 2 | 0 | 14 | 0 | 2 |
| DOM_PUBLIC_KEY | 8 | 0 | 261 | 1 | 2 |
| DOM_SMALLINT | 2 | 0 | 7 | 0 <null> | |

FIG. 2C

| RDB$INDEX_NAME | RDB$RELATION_NAME | RDB$FIELD_NAME | RDB$INDEX_TYPE |
|---|---|---|---|
| SYS_FIELD_IDX1 | SYS_FIELD | SYS_IDENTITY | <null> |
| SYS_FIELD_IDX2 | SYS_FIELD | SYS_IDENTITY | 1 |
| SYS_FIELD_IDX5 | SYS_FIELD | SYS_DOMAIN | <null> |
| SYS_FIELD_IDX4 | SYS_FIELD | SYS_DOMAIN | 1 |
| SYS_FIELD_IDX3 | SYS_FIELD | SYS_TABLE | <null> |
| SYS_FIELD_IDX6 | SYS_FIELD | SYS_TABLE | 1 |

FIG. 2D

```
CREATE TABLE SYS_TABLE (
    SYS_IDENTITY            INT64,
    SYS_NAME                CHAR(31),
    SYS_CAPTION             VARCHAR(50)
    SYS_IS_SYSTEM           INT16,
    SYS_PRIMARY_KEY         INT64,
    SYS_BEFORE_INSERT       INT64,
    SYS_AFTER_INSERT        INT64,
    SYS_BEFORE_UPDATE       INT64,
    SYS_AFTER_UPDATE        INT64,
    SYS_BEFORE_DELETE       INT64,
    SYS_AFTER_DELETE        INT64
);
```

FIG. 3

| SYS_IDENTITY | SYS_NAME | SYS_CAPTION | SYS_IS_SYSTEM | SYS_PRIMARY_KEY | SYS_BEFORE_INSERT | SYS_AFTER_INSERT | SYS_BEFORE_UPDATE | SYS_AFTER_UPDATE | SYS_BEFORE_DELETE | SYS_AFTER_DELETE |
|---|---|---|---|---|---|---|---|---|---|---|
| 1332 | SYS_FORM_WIDGET | SYS_FORM_WIDGET | 1 | 0 | 0 | 0 | 0 | 0 | 0 | 0 |
| 1333 | SYS_FUNCTION | SYS_FUNCTION | 1 | 0 | 0 | 0 | 0 | 0 | 0 | 0 |
| 1334 | SYS_ITERATION | SYS_ITERATION | 1 | 0 | 0 | 0 | 0 | 0 | 0 | 0 |
| 1335 | SYS_JOIN | SYS_JOIN | 1 | 0 | 0 | 0 | 0 | 0 | 0 | 0 |
| 1336 | SYS_LITERAL | SYS_LITERAL | 1 | 0 | 0 | 0 | 0 | 0 | 0 | 0 |
| 1337 | SYS_LOCALE | SYS_LOCALE | 1 | 0 | 0 | 0 | 0 | 0 | 0 | 0 |
| 1338 | SYS_LOOKUP | SYS_LOOKUP | 1 | 0 | 0 | 0 | 0 | 0 | 0 | 0 |
| 1339 | SYS_MENU | SYS_MENU | 1 | 0 | 0 | 0 | 0 | 0 | 0 | 0 |
| 1340 | SYS_MENU_WIDGET | SYS_MENU_WIDGET | 1 | 0 | 0 | 0 | 0 | 0 | 0 | 0 |
| 1341 | SYS_PARAMETER | SYS_PARAMETER | 1 | 0 | 0 | 0 | 0 | 0 | 0 | 0 |
| 1342 | SYS_RECORD | SYS_RECORD | 1 | 0 | 0 | 0 | 0 | 0 | 0 | 0 |
| 1343 | SYS_REFERENCE | SYS_REFERENCE | 1 | 0 | 0 | 0 | 0 | 0 | 0 | 0 |
| 1344 | SYS_RELATIONSHIP | SYS_RELATIONSHIP | 1 | 0 | 0 | 0 | 0 | 0 | 0 | 0 |
| 1345 | SYS_REPLICA | SYS_REPLICA | 1 | 0 | 0 | 0 | 0 | 0 | 0 | 0 |
| 1346 | SYS_STYLE | SYS_STYLE | 1 | 0 | 0 | 0 | 0 | 0 | 0 | 0 |
| 1347 | SYS_SYNCHRONIZE | SYS_SYNCHRONIZE | 1 | 0 | 0 | 0 | 0 | 0 | 0 | 0 |
| 1348 | SYS_SYSTEM | SYS_SYSTEM | 1 | 0 | 0 | 0 | 0 | 0 | 0 | 0 |
| 1349 | SYS_TABLE | SYS_TABLE | 1 | 0 | 0 | 0 | 0 | 0 | 0 | 0 |
| 1350 | SYS_TEST | SYS_TEST | 1 | 0 | 0 | 0 | 0 | 0 | 0 | 0 |
| 1351 | SYS_TOOL_BAR | SYS_TOOL_BAR | 1 | 0 | 0 | 0 | 0 | 0 | 0 | 0 |
| 1352 | SYS_TOOL_WIDGET | SYS_TOOL_WIDGET | 1 | 0 | 0 | 0 | 0 | 0 | 0 | 0 |
| 1353 | SYS_USER | SYS_USER | 1 | 0 | 0 | 0 | 0 | 0 | 0 | 0 |
| 1354 | SYS_VARIABLE | SYS_VARIABLE | 1 | 0 | 0 | 0 | 0 | 0 | 0 | 0 |
| 1355 | SYS_VIEW | SYS_VIEW | 1 | 0 | 0 | 0 | 0 | 0 | 0 | 0 |
| 1356 | SYS_VIEW_LINK | SYS_VIEW_LINK | 1 | 0 | 0 | 0 | 0 | 0 | 0 | 0 |
| 1357 | SYS_VIEW_OBJECT | SYS_VIEW_OBJECT | 1 | 0 | 0 | 0 | 0 | 0 | 0 | 0 |
| 1358 | SYS_WIDGET | SYS_WIDGET | 1 | 0 | 0 | 0 | 0 | 0 | 0 | 0 |
| 1359 | SYS_WIDGET_TYPE | SYS_WIDGET_TYPE | 1 | 0 | 0 | 0 | 0 | 0 | 0 | 0 |

FIG. 4

| SYS_IDENTITY | SYS_CAPTION | SYS_DATA_TYPE | SYS_WIDGET_TYPE | SYS_TABLE | SYS_NAME | SYS_ASC_INDEX | SYS_DESC_INDEX | SYS_DESC_BKIDX | SYS_IS_SYSTEM | SYS_ON_INITIATE | SYS_ON_VALIDATE |
|---|---|---|---|---|---|---|---|---|---|---|---|
| 2911 | SYS_CAPTION | 0 | | 50 | 1254 SYS_DESCRIPTION | | | | | | 0 |
| 2912 | SYS_FIELD | 0 | | 50 | 1255 SYS_IDENTITY | | | | 1 | | 0 |
| 2913 | SYS_JOIN | 0 | | 50 | 1256 SYS_JOIN | | | | 1 | | 0 |
| 2914 | SYS_LOCALE | 0 | | 50 | 1256 SYS_LOCALE | | | | 1 | | 0 |
| 2915 | SYS_CAPTION | 0 | | 50 | 1256 SYS_CAPTION | 0 | | 0 | 1 | | 0 |
| 2916 | SYS_DESCRIPTION | 0 | | 50 | 1256 SYS_DESCRIPTION | 0 | | 0 | 1 | | 0 |
| 2917 | SYS_PRINT_LABEL | 0 | | 50 | 1261 SYS_PRINT_LABEL | 0 | | 0 | 1 | | 0 |
| 2918 | SYS_FIELD | 0 | | 50 | 1353 SYS_IDENTITY | 0 | | 0 | 1 | | 0 |
| 2919 | SYS_FIELD | 0 | | 50 | 1260 SYS_IDENTITY | 0 | | 0 | 1 | | 0 |
| 2920 | SYS_RELATIONSHIP | 0 | | 50 | 1260 SYS_RELATIONSHIP | 0 | | 0 | 1 | | 0 |
| 2921 | SYS_LOCALE | 0 | | 50 | 1260 SYS_LOCALE | 0 | | 0 | 1 | | 0 |
| 2922 | SYS_CAPTION | 0 | | 50 | 1260 SYS_CAPTION | 0 | | 0 | 1 | | 0 |
| 2923 | SYS_DESCRIPTION | 0 | | 50 | 1260 SYS_DESCRIPTION | 0 | | 0 | 1 | | 0 |
| 2924 | SYS_FIELD | 0 | | 50 | 1261 SYS_IDENTITY | 0 | | 0 | 1 | | 0 |
| 2925 | SYS_SYSTEM | 0 | | 50 | 1261 SYS_SYSTEM | 0 | | 0 | 1 | | 0 |
| 2926 | SYS_LOCALE | 0 | | 50 | 1261 SYS_LOCALE | 0 | | 0 | 1 | | 0 |
| 2927 | SYS_CAPTION | 0 | | 50 | 1353 SYS_NAME | 0 | | 0 | 1 | | 0 |
| 2928 | SYS_ORGANIZATION | 0 | | 50 | 1261 SYS_ORGANIZATION | 0 | | 0 | 1 | | 0 |
| 2929 | SYS_CAPTION | 0 | | 50 | 1261 SYS_CAPTION | 0 | | 0 | 1 | | 0 |
| 2930 | SYS_DESCRIPTION | 0 | | 50 | 1261 SYS_DESCRIPTION | 0 | | 0 | 1 | | 0 |
| 2931 | SYS_FIELD | 0 | | 50 | 1262 SYS_IDENTITY | 0 | | 0 | 1 | | 0 |
| 2932 | SYS_TABLE | 0 | | 50 | 1262 SYS_TABLE | 0 | | 0 | 1 | | 0 |
| 2933 | SYS_LOCALE | 0 | | 50 | 1262 SYS_LOCALE | 0 | | 0 | 1 | | 0 |
| 2934 | SYS_CAPTION | 0 | | 50 | 1262 SYS_CAPTION | 0 | | 0 | 1 | | 0 |
| 2935 | SYS_DESCRIPTION | 0 | | 60 | 1262 SYS_DESCRIPTION | 0 | | 0 | 1 | | 0 |
| 2936 | SYS_FIELD | 0 | | 50 | 1263 SYS_IDENTITY | | | | | | 0 |
| 2937 | SYS_VIEW | 0 | | 50 | 1265 SYS_VIEW | | | | | | 0 |
| 2938 | SYS_LOCALE | 0 | | 50 | 1265 SYS_LOCALE | | | | | | 0 |

FIG. 5

| SYS_IDENTITY | SYS_NAME | SYS_CAPTION | SYS_CAN_BE_NULL | SYS_MAX_BYTES | SYS_CHARACTER_SET | SYS_MAX_LENGTH |
|---|---|---|---|---|---|---|
| 946 | SMALLINT | 16-bit Integer | 0 | 0 | N | 0 |
| 947 | INTEGER | 32-bit Integer | 0 | 0 | N | 0 |
| 948 | BIGINT | 64-bit Integer | 0 | 0 | N | 0 |
| 951 | VARCHAR | Character | 0 | 0 | U | 0 |
| 969 | FLOAT | Float | 0 | 0 | N | 0 |
| 980 | DOUBLE | Double | 0 | 0 | N | 0 |
| 1007 | BLOB | Binary | 0 | 0 | N | 0 |
| 1019 | CLOB | Memo | 0 | 0 | N | 0 |
| 15071 | NUMERIC | Numeric | 0 | 0 | N | 0 |
| 15072 | DECIMAL | Decimal | 0 | 0 | N | 0 |
| 15081 | CLOB | Certificate | 0 | 0 | A | 0 |

FIG. 6

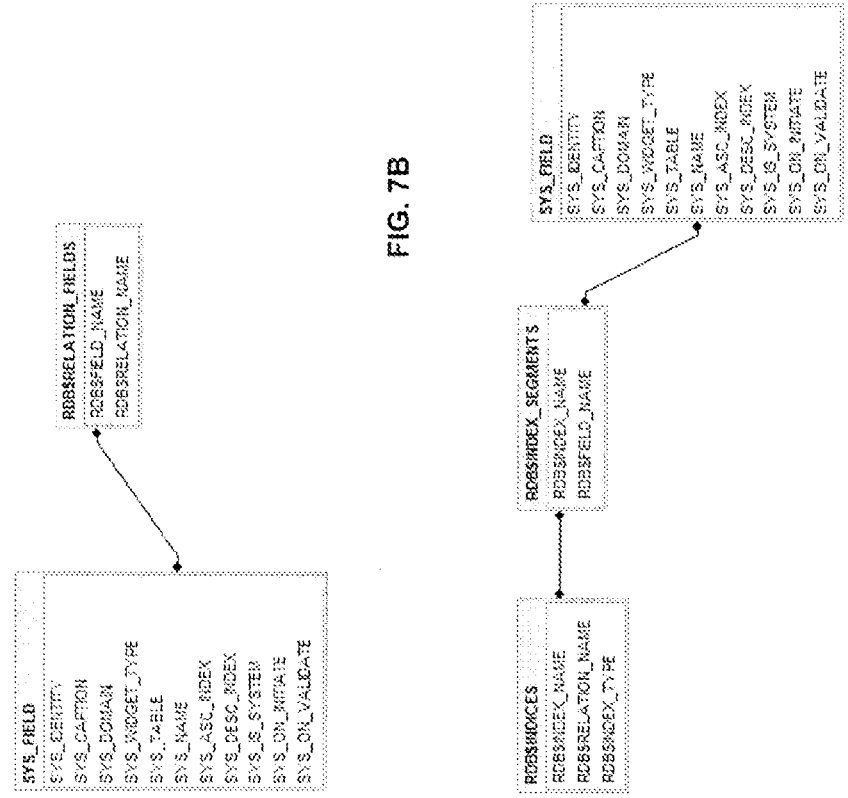
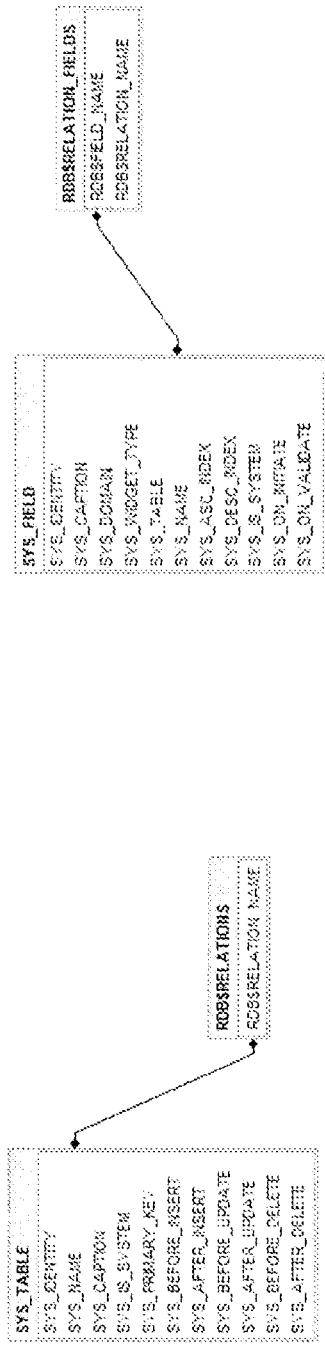
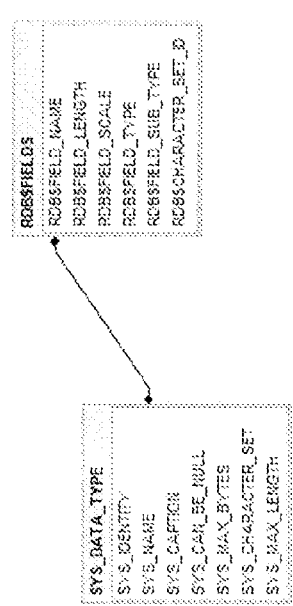
FIG. 7A  FIG. 7B  FIG. 7C  FIG. 7D

```
Quantity::onInitiate()
{
  Quantity = 0;
}

Quantity::onValidate()
{
  if (Quantity < 0) {
    throw validateException("Quantity must be at least 0.");
  }
}

Quantity::beforeInsert()
{
  onValidate();
}

Quantity::beforeUpdate()
{
  onValidate();
}
```

FIG. 9

```
string assign(string src)

boolean is_identical(string src, string comp)
boolean not_identical(string src, string comp)
boolean is_equal(string src, string comp)
boolean not_equal(string src, string comp)

boolean starts_with(string src, string find)
boolean not_starts_with(string src, string find)
boolean contains_literal(string src, string find)
boolean not_contains_literal(string src, string find)
boolean ends_with(string src, string find)
boolean not_ends_with(string src, string find)

boolean contains_pattern(string src, string find)
boolean not_contains_pattern(string src, string find)

integer length(string src)

string left(string src, integer len)
string mid(string src, integer idx, integer len)
string right(string src, integer len)

string prepend(string src, string chr)
string append(string src, string chr)
string insert_at_pos(string src, string chr, integer idx)
string replace_at_range(string src, string chr, integer idx,
integer len)
string remove_from_range(string src, integer idx, integer len)

string replace_literal(string src, string find, string chr)
string remove_literal(string src, string find)

string replace_pattern(string src, string find, string chr)
string remove_pattern(string src, string find)
```

FIG. 11A

```
boolean is_true(boolean src)
boolean is_false(boolean src)

boolean assign_to_bool(boolean src)
integer assign_to_int(integer src)
double assign_to_dbl(double src)

boolean is_equal_to_bool(boolean lvalue, boolean rvalue)
boolean is_equal_to_int(integer lvalue, integer rvalue)
boolean is_equal_to_dbl(double lvalue, double rvalue)
boolean not_equals_bool(boolean lvalue, boolean rvalue)
boolean not_equals_int(integer lvalue, integer rvalue)
boolean not_equals_dbl(double lvalue, double rvalue)
boolean is_greater_than_int(integer lvalue, integer rvalue)
boolean is_greater_than_dbl(double lvalue, double rvalue)
boolean is_less_than_int(integer lvalue, integer rvalue)
boolean is_less_than_dbl(double lvalue, double rvalue)
boolean is_at_least_int(integer lvalue, integer rvalue)
boolean is_at_least_dbl(double lvalue, double rvalue)
boolean is_at_most_int(integer lvalue, integer rvalue)
boolean is_at_most_dbl(double lvalue, double rvalue)

integer add_int(integer lvalue, integer rvalue)
double add_dbl(double lvalue, double rvalue)
integer subtract_int(integer lvalue, integer rvalue)
double subtract_dbl(double lvalue, double rvalue)
integer multiply_int(integer lvalue, integer rvalue)
double multiply_dbl(double lvalue, double rvalue)
integer divide_int(integer lvalue, integer rvalue)
double divide_dbl(double lvalue, double rvalue)
```

FIG. 11B

```
double remainder(double number, double divisor)
double round(double number, integer digits)
double ceiling(double number, double multiple)
double floor(double number, double multiple)
integer absolute_int(integer number)
double absolute_dbl(double number)
integer whole_number(double number)
double fractional_part(double number)

integer greater_int(integer lvalue, integer rvalue)
double greater_dbl(double lvalue, double rvalue)
integer lesser_int(integer lvalue, integer rvalue)
double lesser_dbl(double lvalue, double rvalue)
```

FIG. 11C

```
double pv(double rate, integer nper, double pmt, double fv,
integer due)
double npv(double rate, double[] valuev, integer valuec)
double fv(double rate, integer nper, double pmt, double pv,
integer due)
double pmt(double rate, integer nper, double pv, double fv,
integer due)
double ipmt(double rate, integer period, integer nper, double
pv, double fv, integer due)
double ppmt(double rate, integer period, integer nper, double
pv, double fv, integer due)
double nper(double rate, double pmt, double pv, double fv,
integer due)

double rate(double nper, double pmt, double pv, double fv,
integer due, double guess)
double irr(double[] pmtv, integer pmtc, double guess)
double mirr(double[] pmtv, integer pmtc, double finance_rate,
double reinvest_rate)

double sln(double cost, double salvage, double life)
double syd(double cost, double salvage, double life, double
period)
double ddb(double cost, double salvage, double life, double
period, double factor)
double vdb(double cost, double salvage, double life, double
start, double end, double factor, boolean no_switch)
```

FIG. 11D

```
date utc_date()
date local_date()

time utc_time()
time local_time()

datetime utc_datetime()
datetime local_datetime()

integer local_timezone()

integer point_datetime(datetime src)
integer point_time(time src)
integer second_datetime(datetime src)
integer second_time(time src)
integer minute_datetime(datetime src)
integer minute_time(time src)
integer hour_datetime(datetime src)
integer hour_time(time src)
integer day_of_week_datetime(datetime src)
integer day_of_week_date(date src)
integer day_of_month_datetime(datetime src)
integer day_of_month_date(date src)
integer day_of_year_datetime(datetime src)
integer day_of_year_date(date src)
integer month_datetime(datetime src)
integer month_date(date src)
integer quarter_datetime(datetime src)
integer quarter_date(date src)
integer year_datetime(datetime src)
integer year_date(date src)

integer timezone(datetime src)
```

FIG. 11E

```
datetime set_point_datetime(datetime src, integer point)
time set_point_time(time src, integer point)
datetime set_second_datetime(datetime src, integer second)
time set_second_time(time src, integer second)
datetime set_minute_datetime(datetime src, integer minute)
time set_minute_time(time src, integer minute)
datetime set_hour_datetime(datetime src, integer hour)
time set_hour_time(time src, integer hour)
datetime set_day_datetime(datetime src, integer day)
date set_day_date(date src, integer day)
datetime set_month_datetime(datetime src, integer month)
date set_month_date(date src, integer month)
datetime set_year_datetime(datetime src, integer year)
date set_year_date(date src, integer year)

time set_time(time src, string time)
date set_date(date src, string date)
datetime set_timezone(string src, integer timezone)

datetime add_points_datetime(datetime src, integer points)
time add_points_time(time src, integer points)
datetime add_seconds_datetime(datetime src, integer seconds)
time add_seconds_time(time src, integer seconds)
datetime add_minutes_datetime(datetime src, integer minutes)
time add_minutes_time(time src, integer minutes)
datetime add_hours_datetime(datetime src, integer hours)
time add_hours_time(time src, integer hours)
datetime add_days_datetime(datetime src, integer days)
date add_days_date(date src, integer days)
datetime add_months_datetime(datetime src, integer months)
date add_months_date(date src, integer months)
datetime add_years_datetime(datetime src, integer years)
date add_years_date(date src, integer years)
```

FIG. 11F

```
time assign_time(time src)
date assign_date(date src)
datetime assign_datetime(datetime src)

boolean is_leap_year(integer year)
boolean is_leap_year_datetime(datetime src)
boolean is_leap_year_date(date src)

integer days_in_month(integer month, boolean leap_year)
integer days_in_month_datetime(datetime src)
integer days_in_month_date(date src)

integer days_in_year(integer year)
integer days_in_year_datetime(datetime src)
integer days_in_year_date(date src)

boolean is_on_datetime(datetime lvalue, datetime rvalue)
boolean is_on_date(date lvalue, date rvalue)
boolean is_on_time(time lvalue, time rvalue)
boolean is_before_datetime(datetime lvalue, datetime rvalue)
boolean is_before_date(date lvalue, date rvalue)
boolean is_before_time(time lvalue, time rvalue)
boolean is_on_or_before_datetime(datetime lvalue, datetime rvalue)
boolean is_on_or_before_date(date lvalue, date rvalue)
boolean is_on_or_before_time(time lvalue, time rvalue)
boolean is_after_datetime(datetime lvalue, datetime rvalue)
boolean is_after_date(date lvalue, date rvalue)
boolean is_after_time(time lvalue, time rvalue)
boolean is_on_or_after_datetime(datetime lvalue, datetime rvalue)
boolean is_on_or_after_date(date lvalue, date rvalue)
boolean is_on_or_after_time(time lvalue, time rvalue)
```

FIG. 11G

```
datetime earlier_datetime(datetime lvalue, datetime rvalue)
date earlier_date(date lvalue, date rvalue)
time earlier_time(time lvalue, time rvalue)
datetime later_datetime(datetime lvalue, datetime rvalue)
date later_date(date lvalue, date rvalue)
time later_time(time lvalue, string rvalue)

date day_of_week_on_or_after_date(integer day_of_week, integer
occurrence, date reference)
date day_of_week_after_date(integer day_of_week, integer
occurrence, date reference)
date day_of_week_on_or_before_date(integer day_of_week,
integer occurrence, date reference)
date day_of_week_before_date(integer day_of_week, integer
occurrence, date reference)
```

FIG. 11H

```
// the following C++ pseudo-code:

string left(string, integer)
{
  typedef variant* (*invoke_function)(string, integer);
  library lib("string");
  lib.load();
  function = (invoke_function)lib.resolve("left");
  variant result = function(string, integer);
  return result;
}
```

FIG. 12A

```
// becomes the following XML script:

<Function name="left" caption="left of text">
 <Returns>
  <Result data_type="string"/>
 </Returns>
 <Parameters>
  <Param data_type="string" caption="left of text"/>
  <Param data_type="integer" caption="extending for"/>
 </Parameters>
 <Library name="string" entry_point="left"/>
</Function>
```

FIG. 12B

```
// the following C++ code:

double centigrade_to_fahrenheit(const double c)
{
 double result = 0.0;

result = ((9.0/5.0) * c) + 32.0;

return result;
}
```

FIG. 14A

```
// can be rewritten as:

OUTPUT = add((multiply(divide(9.0, 5.0), c), 32.0)
```

FIG. 14B

```
// and finally becomes the following XML script:

<Function name="centigrade_to_fahrenheit"
    caption="Centigrade to Fahrenheit">
 <Returns>
  <Result data_type="double"/>
 </Returns>
 <Parameters>
  <Param data_type="double" name="param01"
      caption="Centigrade"/>
 </Parameters>
 <Rule>
  <Block type="unconditional">
   <Statement>
    <Subfunction>
     <Library name="math" entry_point="add"/>
     <Arguments>
      <Arg data_type="double">
       <Subfunction>
        <Library name="math" entry_point="multipy"/>
        <Arguments>
         <Arg data_type="double">
          <Subfunction>
           <Library name="math" entry_point="divide"/>
           <Arguments>
            <Arg data_type="double">9.0</Arg>
            <Arg data_type="double">5.0</Arg>
           </Arguments>
          </Subfunction>
         </Arg>
         <Arg data_type="double">param01</Arg>
        </Arguments>
       </Subfunction>
      </Arg>
      <Arg data_type="double">32.0</Arg>
     </Arguments>
    </Subfunction>
   </Statement>
  </Block>
 </Rule>
</Function>
```

FIG. 14C

```
// the following C++ code:

void temperature_in_fahrenheit.on_validate
{
  temperature_in_fahrenheit.value =
    centigrade_to_fahrenheit(temperature_in_centigrade.value);
}
```

FIG. 15A

```xml
// becomes the following XML script:

<Event name="temperature_in_fahrenheit.on_validate">
 <Parameters>
  <Param data_type="int64" name="_event"/>
  <Param data_type="int64" name="_sender"/>
  <Param data_type="int64" name="_transaction"/>
 </Parameters>
 <Script>
 <Block type="unconditional">
  <Statement>
   <Subfunction>
    <INPUT>
    <Function name="centigrade_to_fahrenheit">
    <Arguments>
     <Arg data_type="double">
     temperature_in_centigrade.value
     </Arg>
    </Arguments>
    </INPUT>
   </Subfunction>
  </Statement>
 </Block>
 </Script>
</Event>
```

FIG. 15B

```
// structure of the table and relevant fields

CREATE TABLE ORDER_LINE (
  SYS_IDENTITY        INT64,
  PRODUCT             INT64,
  QUANTITY            INTEGER,
  UNIT_COST           DOUBLE,
  LINE_TOTAL          DOUBLE
);

// definition of LINE_TOTAL formula

LINE_TOTAL = QUANTITY * UNIT_COST
```

FIG. 20

```
// structure of the table and relevant fields

CREATE TABLE ORDER (
  SYS_IDENTITY        BIGINT,
  DATE                DATE,
  TOTAL               DOUBLE
);

// assignment of DOUBLE data type to DATE data type causes
error

DATE = TOTAL;
```

FIG. 21

```
// structure of the table and relevant fields

CREATE TABLE ORDER (
   SYS_IDENTITY          BIGINT,
   DATE                  DATE,
   TOTAL                 DOUBLE
);

// DOUBLE data type argument expecting DATE data type causes
error

DATE = add_days_date(TOTAL, 7);
```

FIG. 22

```
do                                      <-- BLOCK #1 START
                                        <-- CONDITION # 1 START
  Save
  if any of the following are true      <-- CONDITION # 2 START
      Requires Signature
    Requires Authorization
  Send To Manager                       <-- STATEMENT
  else                                  <-- CONDITION # 2 CON'T
    // do nothing
                                        <-- CONDITION # 2 END
                                        <-- CONDITION # 1 END
                                        <-- BLOCK #1 END <-- BLOCK #2 START
for each Outstanding Invoice            <-- ITERATION # 1 START
  Print Invoice                         <-- STATEMENT
                                        <-- ITERATION # 1 END
                                        <-- BLOCK #2 END <-- BLOCK #3 START
if all of the following are true        <-- CONDITION # 3 START
    Outstanding Invoices is equal to 0
  Signature Not Required
  Authorization Not Required
  Increment Salesperson Commission      <-- STATEMENT
else                                    <-- CONDITION # 3 CON'T
  // do nothing
                                        <-- CONDITION # 3 END
                                        <-- BLOCK #3 END
```

FIG. 23

```
// the following conditional structures:

if all of the following are true          SYS_IDENTITY = 1
    some tests
 do this
else
if all of the following are true          SYS_IDENTITY = 2
    some tests
 do this
else
if any of the following are true          SYS_IDENTITY = 3
    some tests
 do this
else
do                                        SYS_IDENTITY = 4
  do this // get mapped to the following structures in table
SYS_CONDITION:
```

| SYS_IDENTITY | SYS_QUANTIFIER | SYS_ELSE_CONDITION |
|---|---|---|
| 1 | -1 | 2 |
| 2 | -1 | 3 |
| 3 | 1 | 4 |
| 4 | 0 | 0 |

FIG. 24

```
for each (SELECT APP_TOTAL FROM APP_ORDER
     WHERE APP_CUSTOMER = 12345) {
  // do something
}
```

FIG. 25

```
// the following test structures:

if all of the following are true          CONDITION # 1
   Outstanding Invoices is equal to 0     SYS_IDENTITY = 1 OF
CONDITION
  Signature Not Required                  SYS_IDENTITY = 2 OF
CONDITION
  Authorization Not Required              SYS_IDENTITY = 3 OF
CONDITION
  if all of the following are true        SYS_IDENTITY = 4 OF
CONDITION
      User is a Manager
   User is in Accounts Department
Process Order                             STATEMENT
else                                      CONDITION # 2
   Get Authorization                      STATEMENT // get mapped to the following structures in table SYS_TEST:
```

| SYS_IDENTITY | SYS_SUBCONDITION | SYS_SUBFUNCTION | SYS_SEQUENCE |
|---|---|---|---|
| 1 | 0 | 1 | 1 |
| 2 | 0 | 2 | 2 |
| 3 | 0 | 3 | 3 |
| 4 | 2 | 0 | 4 |

FIG. 26

```
// the following statement types:

do                                          SYS_CONDITION = 1
  Get Authorization                         SYS_IDENTITY = 1
  if all of the following are true          SYS_IDENTITY = 2
    Authorization is Complete
    Document to Invoice is equal to true
  for each Outstanding Invoice              SYS_IDENTITY = 3
    Print Invoice
    Invoice Printed = true // get mapped to the following structures in table
SYS_STATEMENT:
```

| SYS_IDENTITY | 1 | 2 | 3 |
|---|---|---|---|
| SYS_CONDITION | 1 | 1 | 1 |
| SYS_ITERATION | 0 | 0 | 0 |
| SYS_SUBFUNCTION | 2 | 0 | 0 |
| SYS_SUBCONDITION | 0 | 2 | 0 |
| SYS_SUBITERATION | 0 | 0 | 2 |
| SYS_SEQUENCE | 1 | 2 | 3 |

FIG. 27

| SYS_LITERAL |
| --- |
| SYS_IDENTITY |
| SYS_DATA_TYPE |
| SYS_CAPTION |
| SYS_STRING |
| SYS_NUMBER |
| SYS_BINARY |

FIG. 29A

| SYS_IDENTITY | SYS_DATA_TYPE | SYS_CAPTION | SYS_STRING | SYS_NUMBER | SYS_BINARY |
| --- | --- | --- | --- | --- | --- |
| 3 | 1 | Sales Tax | <null> | 12 | <null> |
| 2 | 2 | Reserved Rights | All rights are reserved. | <null> | <null> |
| 1 | 4 | Company Logo | | <null> | 🖼 |

FIG. 29B

| SYS_IDENTITY | SYS_DATA_TYPE | SYS_NAME | SYS_CAPTION |
|---|---|---|---|
| 1179 | 0 | CURRENT_USER | Current User |
| 4256 | 0 | CURRENT_ROLE | Current Role |
| 4257 | 0 | CURRENT_LOCALE | Current Locale |
| 4258 | 0 | CURRENT_PLATFORM | Current Platform |

```
SELECT
 CUSTOMER.FULL_NAME,
 ORDER.DATE,
 ORDER.TOTAL,
 ORDER.PAID
FROM
 CUSTOMER
OUTER JOIN
 ORDER
ON
 CUSTOMER.SYS_IDENTITY = ORDER.CUSTOMER
WHERE
 is_false(ORDER.PAID)
AND
 is_later_date(ORDER.DATE,
        add_days_date(utcdate(), -28))
ORDER BY
 CUSTOMER.FULL_NAME;
```

FIG. 32

```
class PushButton {
public :
    identity ;
    caption ;
    icon ;
    onClick ;
private :
};
```

| SYS_PUSHBUTTON |
|---|
| SYS_IDENTITY |
| SYS_CAPTION |
| SYS_ICON |
| SYS_ON_CLICK |

FIG. 34A

| SYS_PUSHBUTTON | | | |
|---|---|---|---|
| SYS_IDENTITY | SYS_CAPTION | SYS_ICON | SYS_ON_CLICK |
| 21 | Cut | ✂ | 210 |
| 22 | Copy | 📋 | 220 |
| 23 | Paste | 📋 | 230 |

FIG. 34B

| SYS_IDENTITY | SYS_CAPTION | SYS_ICON | SYS_CLASS_NAME | SYS_LIBRARY_PATH |
|---|---|---|---|---|
| 50 | Text Input | | TextInput | |
| 51 | Check Box | | CheckBox | |
| 1053 | Drop Select | | DropSelect | |
| 54 | Push Button | | PushButton | |
| 58 | Radio Select | | RadioSelect | |
| 59 | Rich Text Input | | RichTextArea | |
| 60 | Plain Text Input | | PlainTextArea | |
| 1054 | Drop Lookup | | DropLookup | |
| 105 | Table | | Table | |
| 148 | List Select | | ListSelect | |
| 970 | Image View | | ImageView | |
| 972 | Date Input | | DateInput | |
| 973 | Time Input | | TimeInput | |
| 974 | Date and Time Input | | DateTimeInput | |
| 998 | Integer Spin Box | | IntegerSpin | |
| 999 | Float Spin Box | | FloatSpin | |

FIG. 36

| SYS_IDENTITY | SYS_WIDGET | SYS_CAPTION | SYS_ICON | SYS_ON_CLICK |
|---|---|---|---|---|
| 1121 | 1101 | Customer | <null> | 0 |
| 1122 | 1102 | Get Authorization |  | 0 |
| 1123 | 1103 | Stock Levels | <null> | 0 |

| SYS_IDENTITY | SYS_COLUMN | SYS_WIDGET_TYPE |
|---|---|---|
| 1031 | 0 | 51 |
| 1038 | 0 | 52 |
| 524 | 0 | 50 |
| 1101 | 0 | 54 |
| 1102 | 0 | 54 |
| 1103 | 0 | 54 |

FIG. 38

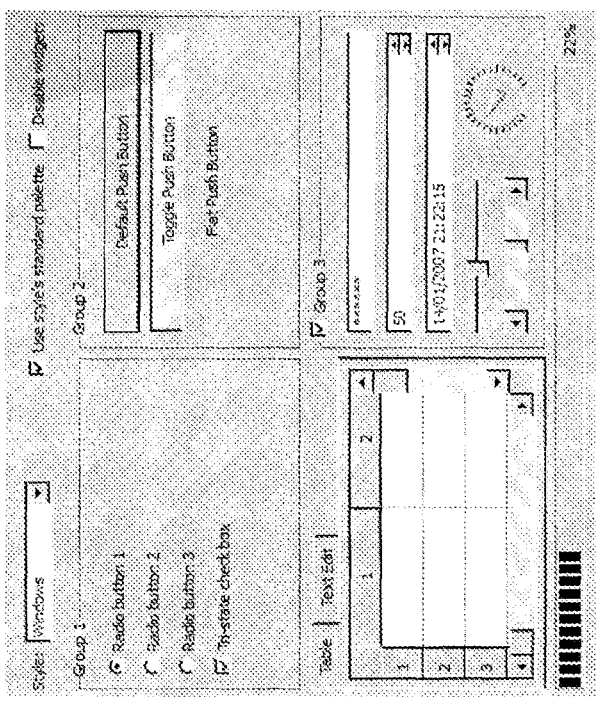
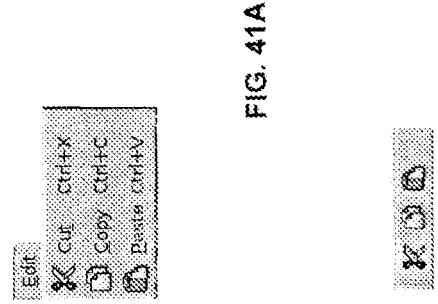
FIG. 41A
FIG. 41B
FIG. 41C

```
CREATE DOMAIN PART_NUMBER AS CHAR(6) CHARACTER SET ASCII NOT
NULL
```

FIG. 45A

```
UPDATE SYS_DATA_TYPE SET SYS_CAPTION = 'Part Number'
   WHERE SYS_NAME = 'PART_NUMBER'
```

FIG. 45B

```
CREATE TABLE PRODUCT (
   SYS_IDENTITY          BIGINT,
   NAME                  STRING,
   PART_NUMBER           PART_NUMBER,
   UNIT_PRICE            CURRENCY
)
```

FIG. 46A

```
UPDATE SYS_TABLE SET SYS_CAPTION = 'Product'
   WHERE SYS_NAME = 'PRODUCT'
```

FIG. 46B

```
UPDATE SYS_FIELD SET SYS_CAPTION = 'Part Number'
   WHERE SYS_NAME = 'PART_NUMBER'
```

FIG. 46C

```
CREATE TRIGGER BI_PRODUCT FOR PRODUCT
ACTIVE BEFORE INSERT POSITION 0
AS
BEGIN
  CALL INTERPRETER ( EVENT_TYPE, SENDER, TRANSACTION )
END
```

FIG. 47

```
CREATE INDEX IDX3 ON SYS_FIELD (SYS_TABLE)
```

FIG. 48

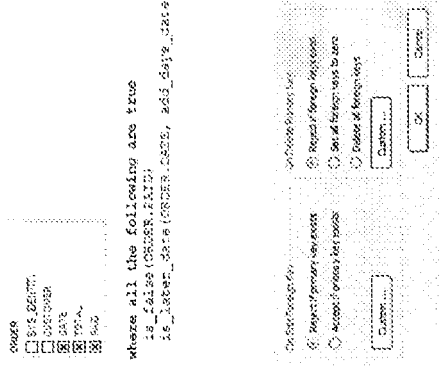
FIG. 50D
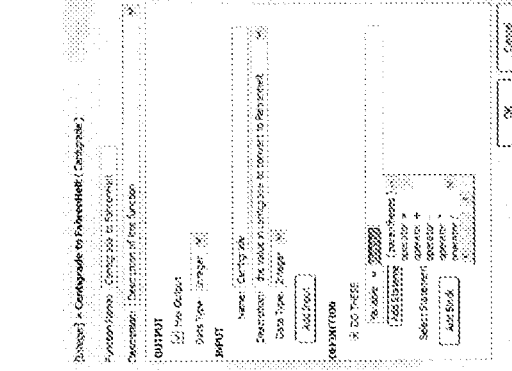
FIG. 50E
FIG. 50F
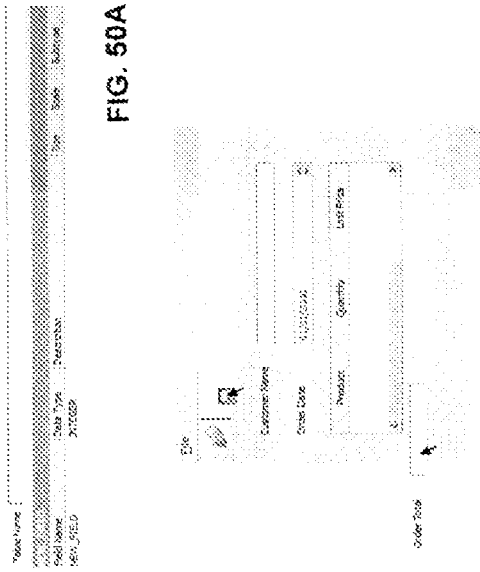
FIG. 50A
FIG. 50B
FIG. 50C

SYSTEM AND METHOD OF CONCLUSIVELY VERIFYING THE CORRECTNESS OF AN INFORMATION SYSTEM WITHOUT NEEDING TO TEST EVERY COMBINATION OF BEHAVIOR AT RUN-TIME

CROSS-REFERENCE TO RELATED APPLICATIONS

This application is a continuation of U.S. patent application Ser. No. 12/520,274, entitled "SYSTEM AND METHOD OF CONCLUSIVELY VERIFYING THE CORRECTNESS OF AN INFORMATION SYSTEM WITHOUT NEEDING TO TEST EVERY COMBINATION OF BEHAVIOR AT RUN-TIME," filed by Paul Leslie Tomkins, which is a national stage entry under 35 U.S.C. 371 of PCT/GB08/00296, filed on Jan. 30, 2008, which claims priority upon UK Patent Application No. 0701915.1 filed on Feb. 1, 2007, the entire disclosures of which are incorporated herein by reference.

BACKGROUND OF THE INVENTION

1. Field of the Invention

The invention relates to the initial development and later adaption of applications and in particular to information systems which include a database and one or more clients or user-interfaces. The invention goes beyond the simple storage of content data in the database to the storage of system data, application data and rule data required to develop and run an information system. On connecting to the database a client or user-interface program loads the system data, application data and rule data to generate an information system.

2. Relevant Background

Information systems are well-known. Examples include accounting, stock control and contact management systems. At a simple level, each of these systems comprise a database and one or more clients or user-interfaces. At an intermediate level of detail, they comprise tables, content data, data sets, forms and rules. At a more detailed level, an information system is composed of tables, fields, data types, indexes, data sets, entities, columns, joins, filters, data sources, menus, menu widgets, toolbars, tool widgets, forms, form widgets, events, functions, blocks, iterations, conditions, tests and statements.

While a stock control system will clearly have a different set of application tables, fields, data sets, forms, rules and content data to a contact management system both information systems are made up of substantially the same features like tables, content data, data sets, forms and rules. It is in the number and behaviour of these features that information systems differ.

The behaviour of each of these features has to operate in harmony with the behaviour of the other features for the system to work correctly. Assume an information system has a number of tables, fields and rules. It is not uncommon, either during the initial development or later adaptation, for the data structure of an information system to be changed. This means that tables and fields might need to be added, renamed or removed. However, the action of changing the data structure means that anything dependent on that data structure will also need to be updated. For example, any relationship rules between the tables may have to be updated and any validation rules which reference a changed field will have to be updated. As updates are made so the developer has to ensure that those changes do not affect features further up the stack. Clearly, the lower in the stack that a change is made, where the chain of dependencies is longer, the more checks and updates need to be performed and the more time-consuming and error-prone changes become.

What makes the initial development and later adaptation of information systems using the traditional architecture time-consuming and error-prone is that the traditional architecture does not make it easy to identify dependencies or to conclusively verify the correctness of an application.

The way in which features are defined in the traditional architecture do not make it easy for dependencies to be identified. Often in the traditional architecture the definitions of tables and fields are embedded in the database API, Application Programming Interface; rules are defined in a proprietary procedural SQL, Structured Query Language, in the database or in C++ or Basic in the client or user-interface; data sets are defined as SQL strings and user-interface elements are defined in C++ or Basic. It therefore requires the developer to locate and search through the code to identify and update dependencies and to verify that references point to actual objects and that those referenced objects are computationally compatible.

Information systems differ architecturally in where they incorporate different features; the database, the client or user-interface or any combination of these. Content data is always stored in the database and forms are always a feature of the user-interface. But rules and data sets can be defined in the database, the client or user-interface or a combination of any of these and even sometimes reproduced in the database, the client or user-interface. The effect of this distribution of features is that developers can only really demonstrate the correctness of a system by testing every possible combination of behavior at run-time.

Given that information systems are so difficult to build, update and verify it is little wonder that users buy off-the-shelf packages and adapt their processes to the package rather than adapting the package to their processes. It is also the reason why customized systems are so time-consuming, expensive and error-prone and why so much development overshoots schedules and budgets and why so many projects fail altogether.

What is needed is an architecture which allows information systems to be developed and adapted quickly and where the application can be assured of correctness irrespective of whatever changes it is subjected to.

SUMMARY OF THE INVENTION

The object of this invention is to provide an architecture for the initial development and later adaption of information systems which includes a database and one or more client or user-interface programs so that applications can be developed and adapted quickly and where the application can be assured of correctness irrespective of whatever changes it is subjected to.

Accordingly, this invention provides a system comprising a database, one or more client or user-interface programs and any number of supporting libraries whose system data, application data and rule data are stored in the database alongside the content data so that the correctness of the system can be ensured.

Preferably the system structures, application structures, system data, application data, rule data and content data are stored in the same relational database but may instead be stored in different relational databases, in non-relational databases, in any persistent store or an in-memory structure;

all application-specific properties and events are stored in the database but some properties and events can be stored external to the database; the integrity checking occurs both at the user-interface or client and then again at the database but such checks could occur any number of times at the point of selecting the options in the user-interface, in a middleware application through which data is passed between the user-interface or client and the database, or on committing the changes in the database.

BRIEF DESCRIPTION OF THE DRAWINGS

A preferred embodiment of the invention will now be described with reference to the accompanying drawings in which:

FIGS. 2A-2D illustrate the meta data provided by the Firebird table RDB$RELATIONS, RBD$RELATION_FIELDS, RBD$FIELDS, RBD$INDICES and RBD$INDEX_SEGMENTS.

FIG. 3 illustrates an example of DDL, data definition language.

FIG. 4 illustrates the data structure, SYS_TABLE, for both system and application tables.

FIG. 5 illustrates the data structure, SYS_FIELD, for both system and application fields.

FIG. 6 illustrates the data structure, SYS_DATA_TYPE, for both system and application data types.

FIGS. 7A-7D illustrate how the data in system tables SYS_TABLE, SYS_FIELD and SYS_DATA_TYPE maintain integrity with the Firebird tables, RDB$RELATIONS, RDB$RELATION_FIELDS, RDB$FIELDS, RDB$INDICIES and RDB$INDEX_SEGMENTS.

FIG. 9 illustrates examples of rules in the traditional architecture of information systems.

FIGS. 11A-11H list sets of functions that are shipped with the present invention and organized into dynamically linked libraries.

FIGS. 12A-12B illustrate how function wrappers would be defined in C++ in comparison with how they are defined in the present invention's XML format.

FIGS. 14A-14C illustrate how custom functions would be defined in C++ and how they are translated in the present invention's XML format.

FIGS. 15A-15B illustrate how event scripts would be defined in C++ and how they are translated in the present invention's XML format.

FIG. 20 illustrates a field being assigned a value of the correct or compatible data type.

FIG. 21 illustrates a field being assigned a value of an incompatible data type.

FIG. 22 illustrates a function being assigned an argument value of an incompatible data type.

FIG. 23 illustrates a script as it is displayed in the user-interface and which points out the individual blocks in the script identifying the different condition blocks and the iteration blocks.

FIG. 24 illustrates a script as it is displayed in the user-interface and which points out the individual conditional structures.

FIG. 25 helps to illustrate an iteration over a dataset.

FIG. 26 illustrates a script as it is displayed in the user-interface and which shows a series of tests and the types of tests in the condition.

FIG. 27 illustrates a script as it is displayed in the user-interface and which shows a function, a condition and an iteration within the context of a condition.

FIGS. 29A-29B illustrate the data structure, SYS_LITERAL.

FIG. 32 illustrates an example of an SQL statement.

FIGS. 34A-34B illustrate how records in a table become object instances and how field values become object properties.

FIG. 36 illustrates the data structure, SYS_WIDGET_TYPE.

FIG. 38 illustrates the table, SYS_WIDGET.

FIGS. 41A-41C illustrate a menu, a toolbar and a form which contain a number of widgets.

FIGS. 45A-45B illustrate the commands required to add an application data type.

FIGS. 46A-46C illustrate the commands required to add an application table.

FIG. 47 illustrates the definition of a trigger on a table to call the interpreter from the database.

FIG. 48 illustrates the commands required to add an application index.

FIGS. 50A-50F illustrate a selection of various "drag and drop" and "point and select" editors.

DETAILED DESCRIPTION OF THE INVENTION

Figure 1:
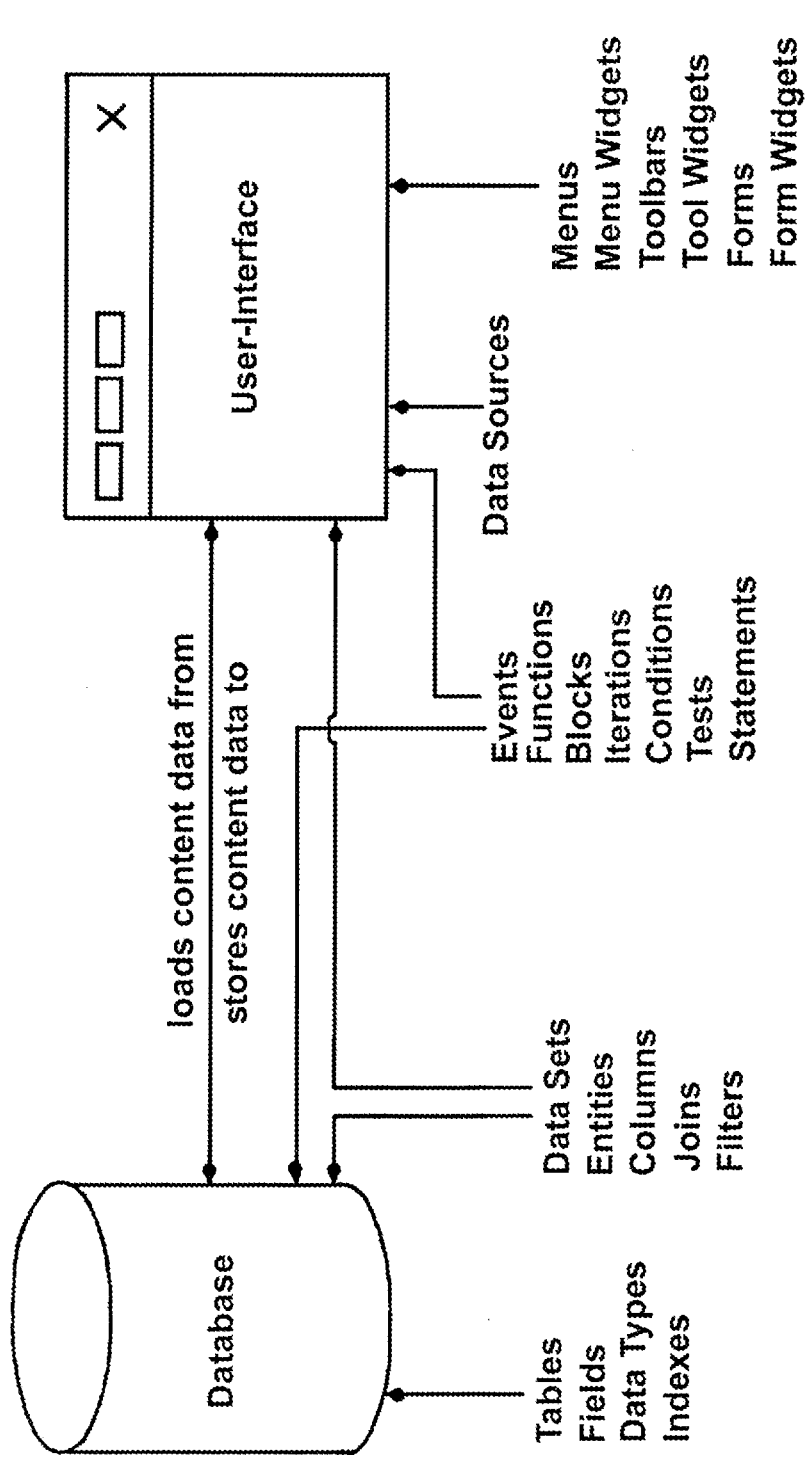
FIG. 1 illustrates the traditional architecture of information systems.

The present invention describes an architecture for an information system which includes a database and one or more client or user-interface programs so that information systems can be developed and adapted quickly and where the application can be assured of correctness irrespective of whatever changes it is subjected to.

The key aspect of the present invention is the storage of system data, application data and rule data in the database alongside content data in such a way that the integrity of the system is ensured. Hence, to understand the description of the present invention we will start with how information systems are traditionally designed and methodically re-architect the process one stage at a time such that a person skilled in the art can follow the logic, appreciate the benefits and replicate the architecture.

The description will provide the opportunity to demonstrate how supplementary features can be added to an information system in the form of extensions and how such extensions are integrated consistently into the architecture of the present invention. The description will then take as an example a basic order entry system which exhibits all the core features of an information system.

DEFINITIONS

A database is in any persistent store or in-memory structure in which data is stored. A program is a generic user-interface or client which provides the framework into which the number and behaviour of system and application-specific features are loaded, which generates instances and customizes the behaviour of application-specific objects and from which system and application rules can be executed. In doing so, generic user-interface and client programs are transformed into application-specific user-interface and clients. In the present invention, a distinction is made between a user-interface program and a client program. The present invention provides a module for the Apache HTTP web server. The module connects to the database like a user-interface program but does not directly provide a user-interface. The user-interface to the module is provided independently by the web browser.

System structures are defined as structures which are consistent across all types of information system. For example, system structures comprise the tables, fields, data types and rules which features common to all types of information systems can be stored in and validated with. Such features include the tables, fields, data types, indexes, data sets, entities, columns, joins, filters, data sources, menus, menu widgets, toolbars, tool widgets, forms, form widgets, events, functions, blocks, iterations, conditions, tests and statements of an information system.

Application structures are defined as structures which are specific to a type of information system. In a basic order entry system application structures might include tables and fields to store products, customers, orders and the individual order lines data.

System data is defined as data which is consistent across all types of information systems. System data lists the system tables, system fields, system data types and system rules which are common to all types of information system. In the present invention the boolean field SYS_IS_SYSTEM is set to 1 to identify system data as opposed to application data in the system structures.

Application data is defined as data which distinguishes one type of information system from another. Application data lists the number and behaviour of the features required by the specific information system. For example, application data lists the application-specific tables, fields, data types, indexes, data sets, entities, columns, joins, filters, data sources, menus, menu widgets, toolbars, tool widgets, forms, form widgets events, functions, blocks, iterations, conditions, tests and statements and the application-specific behaviour of each of these individual features. In the present invention the boolean field SYS_IS_SYSTEM is set to 0 to identify application data as opposed to system data in the system structures.

Content data is defined as data stored in the application-specific structures. In a basic order entry content data might include the list of products, customers, orders and the content of the individual lines of an order.

Rule data is defined as data which is used to ensure the correctness of the system, application and content data. In the present invention the boolean field SYS_IS_SYSTEM is set to 1 to indicate system rules and to 0 to indicate application rules in the system structures.

FIG. 1 illustrates the traditional architecture of information systems with features distributed between the database and the user-interface. The description will therefore start with the four system features which are always stored in the database. These are tables, fields, data types and indexes.

Database architecture generally makes the list of tables accessible through the application programming interface, API, of the database. The API also lists which fields belong to which tables; the data types of the individual fields and the indexes that are applied to those fields.

Some databases, Firebird as an example and the database used in the present invention, go further and provide this meta data in Firebird tables RDB$RELATIONS as illustrated in FIG. 2a, RBD$RELATION_FIELDS as illustrated in FIG. 2b, RBD$FIELDS as illustrated in FIG. 2c and a combination of RDB$INDICES and RDB$INDEX_SEGMENTS as illustrated in FIG. 2d. That this information is available in a structured format consistent with the architecture proposed by the present invention provides further reliability as explained below.

Changes to the database, usually expressed in DDL, data definition language, examples of which appear in FIG. 3, ensure that a field can never be assigned to a non-existent table; that a field can never be assigned a non-defined data type and that an index can never be applied to a non-existent field.

The database further ensures that if a table is deleted or renamed, usually expressed in DDL, examples of which appear in FIG. 3, then all the fields assigned to that table are deleted or reassigned to the renamed table. If a field is deleted or renamed any indexes assigned to that field are deleted or reassigned to the newly renamed field. The database will reject a request to delete or rename a data type which is referenced by a field.

Internally, most databases maintain the integrity of their meta data as described above. Relational databases, in particular, go further in providing tools like triggers and stored procedures to developers to maintain the integrity of the content data as well. The present invention uses this feature to provide an environment for the initial development and later adaptation of information systems which ensures the correctness of the system.

The present invention can now use this table, field and data type meta data provided by structures in Firebird illustrated in FIGS. 2a, 2b, 2c and 2d to provide a further list of tables, fields and data types as system data in system structures.

FIG. 4 illustrates the data structure for both system and application tables. Notice that the definition of system table SYS_TABLE is inserted into SYS_TABLE itself as a record.

FIG. 5 illustrates the data structure for both system and application fields. Note that the definition of system table SYS_FIELD is inserted into SYS_TABLE, shown in FIG. 4, as a record and the fields in SYS_TABLE and SYS_FIELD are inserted into table SYS_FIELD as records as shown in FIG. 5.

FIG. 6 illustrates the data structure for both system and application data types. The definition of system table SYS_DATA_TYPE is inserted into table SYS_TABLE, shown in FIG. 4, as a record and the fields in SYS_DATA_TYPE are inserted into table SYS_FIELD as records as shown in FIG. 5.

The reader will notice that indexes are defined in the table SYS_FIELD by the boolean flag fields, SYS_ASC_INDEX and SYS_DESC_INDEX, and that as a consequence there is no need for a separate system table to store this data.

By linking the system data with the Firebird provided meta data this invention can be confident that the tables, fields, data types or indexes listed as the system data do exist and are defined as listed in the actual database. That this meta data provided by Firebird is available in a structured format consistent with the architecture of the present invention provides the architecture with absolute reliability as shown in FIG. 7a which illustrates how the data in system table SYS_TABLE maintains integrity with the Firebird meta data provided by RDB$RELATIONS with a join on SYS_TABLE.SYS_NAME and RDB$RELATIONS.RDB$RELATION_NAME; FIG. 7b which illustrates how the data in system table SYS_FIELD maintains integrity with the Firebird meta data provided by RDB$RELATION_FIELDS with a join on SYS_FIELD.SYS_NAME and RDB$RELATION_FIELDS.RDB$FIELD_NAME; FIG. 7c which illustrates how the data in system table SYS_DATA_TYPE maintains integrity with the Firebird meta data provided by RDB$FIELDS with a join on SYS_DATA_TYPE.SYS_NAME and RDB$FIELDS. RDB$FIELD_NAME and FIG. 7d illustrates how indexes defined in system table SYS_FIELD maintain integrity with the Firebird meta data provided by RDB$INDICIES and RDB$INDEX_SEGMENTS with a join on RDB$INDEX_SEGMENTS.RDB$FIELD_NAME and SYS_FIELD.SYS_NAME.

The reader will notice that the definition of system tables, but not Firebird meta data structures, like SYS_TABLE in FIG. 4 and SYS_FIELD in FIG. 5, contain foreign keys. Unless specified otherwise, the foreign key references the field with name SYS_IDENTITY in the table of the same name as the foreign key field. In the present invention, the primary key is always one field with the name SYS_IDENTITY. The illustrations also help identify the foreign keys which show a relationship line joining the foreign key to the primary key. Unless specified otherwise, the value in the foreign key field must contain a value in the referenced table's primary key or 0. Unless specified otherwise, referential integrity between tables is a one-to-many relationship type.

For example, table SYS_FIELD has a foreign key field, SYS_TABLE, which references field SYS_IDENTITY in table SYS_TABLE in a one-to-many relationship. Table SYS_FIELD has a foreign key field, SYS_DATA_TYPE, which references field SYS_IDENTITY in table SYS_DATA_TYPE in a one-to-many relationship. Table SYS_FIELD also has a foreign key, SYS_WIDGET_TYPE, which references field SYS_IDENTITY in table SYS_WIDGET_TYPE in a one-to-many relationship. Table SYS_WIDGET_TYPE is discussed below.

The SYS_TABLE and SYS_DATA_TYPE foreign key references in table SYS_FIELD are further controlled by references in the Firebird meta data, as illustrated in FIG. 7b and FIG. 7c, which ensure that the field listed in SYS_FIELD is actually a field in the table that SYS_FIELD.SYS_TABLE claims to be a member of and that the field is actually of the type that SYS_FIELD.SYS_DATA_TYPE claims to be.

Integrity is maintained between the present invention's system data and Firebird meta data using procedural SQL in triggers in Firebird such that whenever a table, field, data type or index in Firebird is added, removed or changed a trigger executes and synchronizes the system tables, SYS_TABLE, SYS_FIELD and SYS_DATA_TYPE. Further triggers written in Firebird procedural SQL ensure that data in tables SYS_TABLE, SYS_FIELD and SYS_DATA_TYPE does reflect the meta data in the tables RDB$RELATIONS, RDB$RELATION_FIELDS, RDB$FIELDS, RDB$INDICIES and RDB$INDEX_SEGMENTS.

All other integrity rules, unless otherwise specified, operating on system, application or content data are defined with the present invention's rules which are described below.

Figure 8:
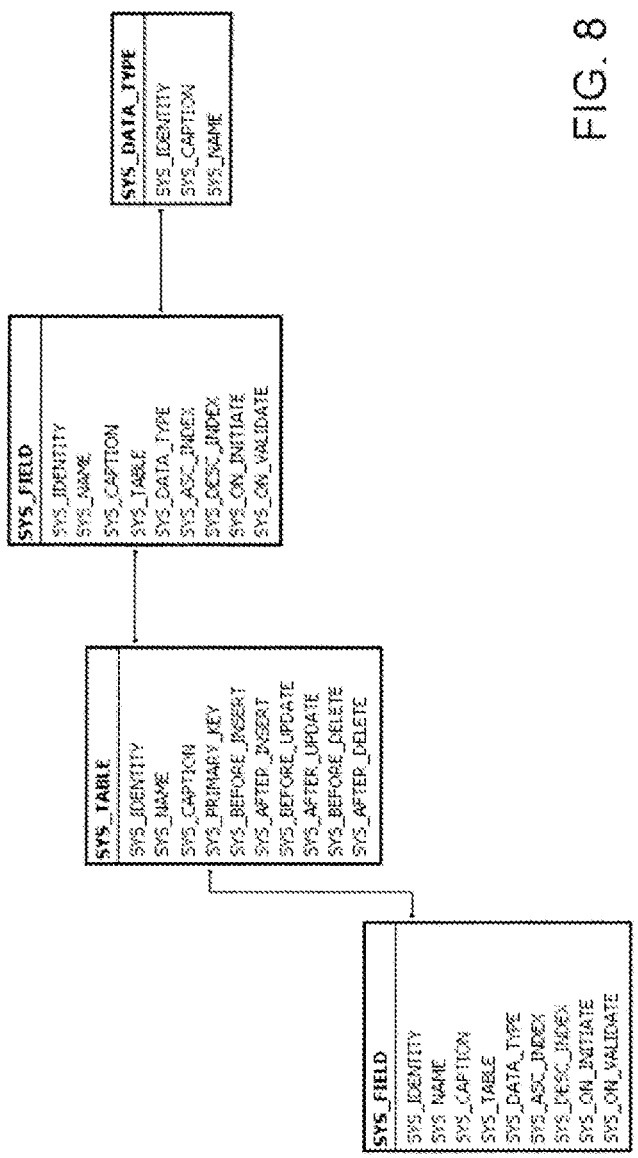
FIG. 8 illustrates how system tables SYS_TABLE, SYS_FIELD and SYS_DATA_TYPE are related.

FIG. 8 illustrates how system tables SYS_TABLE, SYS_FIELD and SYS_DATA_TYPE are related. Field SYS_PRIMARY_KEY in table SYS_TABLE is a foreign key referencing field SYS_IDENTITY in table SYS_FIELD and identifies the primary key field. Field SYS_TABLE in table SYS_FIELD is a foreign key referencing field SYS_IDENTITY in table SYS_TABLE and identifies the table of which the field is a member. Field SYS_DATA_TYPE in table SYS_FIELD is a foreign key referencing field SYS_IDENTITY in table SYS_DATA_TYPE and identifies the data type of the field.

The field SYS_CAPTION in tables SYS_TABLE, SYS_FIELD and SYS_DATA_TYPE stores the user-friendly name of the object which is displayed in the user-interface in contrast to field SYS_NAME which stores the internal name of the object.

The first stages, therefore, in re-architecting the initial development and later adaptation of information systems is to provide system data types in which to store system data and to provide system tables and fields to list the tables, fields, data types and indexes defined in the database. The present invention builds on this foundation as will be described later.

FIG. 1 also illustrates that in the traditional architecture of information systems rules can be defined in the database, the client or user-interface or a combination of all of these and even sometimes reproduced in the database and the clients or user-interfaces.

Examples of rules in the traditional architecture are illustrated in FIG. 9. When rules are incorporated into the database and multiple clients and user-interfaces, for example, a desktop client, a web server or a web client, it is common for that programming logic to be reproduced and written in different computer languages for each environment. For example, a validation rule written inside the database may be written in a proprietary procedural SQL language; the same validation on a desktop client may be written in C++ or Basic and either compiled into the application or interpreted by the application. On a web server, the same validation may be coded in PHP and, in a web client, the same validation may be re-coded again in JavaScript. In this situation, there is the high possibility of subtle differences in logic creeping into the system because of language differences.

Accordingly, the present invention resolves these two issues by storing all rules in the database, by declaring a rule syntax as XML, extensible mark-up language, and by executing the interpreted rule scripts through the same dynamically linked function libraries. This is illustrated in FIG. 10.

By calling the same dynamically linked function libraries, executed from the database and any client or user-interface, the possibility of subtle differences in logic creeping into the system is substantially reduced. Any difference in logic would then owe its existence to the presence of functions in one environment and absence in another or to different versions of the same functions between environments.

The two potential causes for inconsistency, absence of functions and version differences, could be eliminated by running the database and all clients and user-interfaces on the same machine thereby sharing the same dynamically linked function libraries. This, however, is not always possible in a client-server environment.

Figure 10:
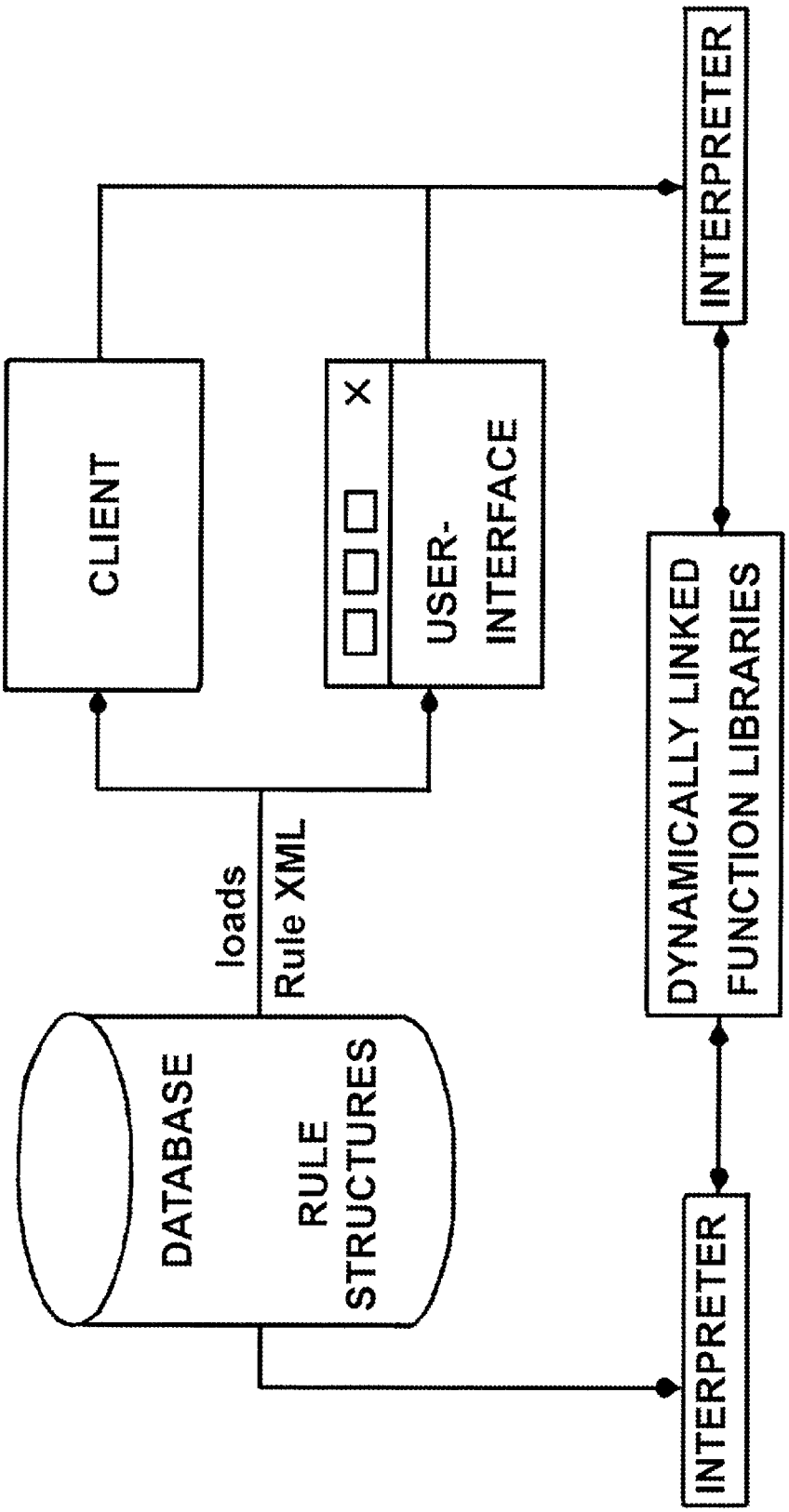
FIG. 10 illustrates XML rules loaded from the database and being interpreted by the database, client and user-interface through the same dynamically linked function libraries.

The present invention proposes to write, as illustrated in FIG. 10, a rule interpreter class for the Firebird database engine, the database used in the present invention, which will be able to load the rule XML, described below, for the event being executed. The rule interpreter class will not only have access to the transaction context in which the event is being executed but also will be able to call the appropriate functions which are organized into dynamically linked libraries again shown in FIG. 10. FIGS. 11A-11H list sets of functions that are frequently shipped with most programming tools and shipped with the present invention.

The present invention also proposes to write, as illustrated in FIG. 10, a rule interpreter class which can be shared by all clients and user-interfaces, which will be able to load the rule XML, described below, from the databases and, like the rule interpreter class in the database, described above, will not only have access to the data source, described below, in which the event is being executed but also will be able to call the appropriate functions which are organized into dynamically linked libraries shown in FIG. 10 and FIGS. 11A-11H.

The sets of functions listed in FIGS. 11A-11H are designed in the present invention to be callable from the rule interpreter engine used by the database or from the rule interpreter engines used by the clients or user-interfaces.

Rules are defined as scripts which comprise variables, conditions, iterations and functions and the present invention provides two types of functions, function wrappers and custom functions.

Function wrappers are scripts that provide direct access to the pre-compiled functions shipped with the system by calling them directly. Examples of such pre-compiled functions, shown in FIGS. 11A-11G, are shipped with most programming tools and, in the present invention, are organized into dynamically linked function libraries when they need to be called equally by the database and any clients or user-interfaces. FIG. 12 shows function wrappers as they would be defined in C++ in comparison with how they are defined in the present invention's XML format which the end-user calls in custom functions or in event scripts.

Not all function wrappers call pre-compiled functions in dynamically linked libraries. Function wrappers may also call functions defined directly in the database, client, user-interface, operating system or any external application. Defining a function directly in the database, client or user-interface is appropriate when the functionality provided by that function applies only to the database, client or user-interface. An example may be a function to return the current transaction number in the database or a function to maximize the user-interface program.

Custom functions are scripts defined by the end-user of the information system. An example of a custom function in the traditionally architecture is shown in FIG. 12a and the same function described in present invention's XML format is shown in FIG. 12b. Function wrappers and custom functions can be re-used in as many other custom functions or event scripts as the user chooses.

The programming paradigm of the present invention, like most information systems, uses event-driven programming where code is executed as a result of, for example, clicking a button, updating a record or receiving an HTTP request. On the occurrence of such events scripts are executed.

Most databases provide events of the type BEFORE_INSERT, AFTER_INSERT, BEFORE_UPDATE, AFTER UPDATE, BEFORE_DELETE and AFTER DELETE which are executed whenever records are inserted, updated and deleted from tables. By calling the proposed rule interpreter from within the database on each of these events with the type of event, the sender of the event and the identity of the transaction the interpreter can look up the appropriate event XML script and execute it.

FIG. 4 shows for each table, defined as a separate record in table SYS_TABLE, the identity of the event as listed in the primary key of system table SYS_EVENT_INSTANCE which will be executed on the BEFORE_INSERT event with the foreign key field SYS_BEFORE_INSERT; the identity of the event as listed in the primary key of system table SYS_EVENT_INSTANCE which will be executed on the AFTER_INSERT event with the foreign key field SYS_AFTER_INSERT; the identity of the event as listed in the primary key of system table SYS_EVENT_INSTANCE which will be executed on the BEFORE_UPDATE event with the foreign key field SYS_BEFORE_UPDATE; the identity of the event as listed in the primary key of system table SYS_EVENT_INSTANCE which will be executed on the AFTER UPDATE event with the foreign key field SYS_AFTER_UPDATE; the identity of the event as listed in the primary key of system table SYS_EVENT_INSTANCE which will be executed on the BEFORE_DELETE event with the foreign key field SYS_BEFORE_DELETE; and the identity of the event as listed in the primary key of system table SYS_EVENT_INSTANCE which will be executed on the AFTER_DELETE event with the foreign key field SYS_BEFORE_DELETE. This is one of those situations where the name of the foreign key does not correspond with the name of the table whose primary key it references.

FIG. 5 shows for each field, defined as a separate record in table SYS_FIELD, the identity of the event as listed in the primary key of system table SYS_EVENT_INSTANCE which will be executed on the ON_VALIDATE event with the foreign key field SYS_ON_VALIDATE which is appropriate for both the database and user-interfaces or clients; and the identity of the event as listed in the primary key of system table SYS_EVENT_INSTANCE which will be executed on the ON_INITIATE event with the foreign key field SYS_ON_INITIATE which is applicable only to user-interfaces or clients. This is another of those situations where the name of the foreign key does not correspond with the name of the table whose primary key it references.

The reason why the same event is executed both on the database and the client or user-interface is that executing the event on the database provides assurance that the validation, taken as the example here, will always be executed thus maintaining the integrity of the data. However, there is network latency between the user requesting that some data should be changed on the database and the response from the database that the request has been received and accepted or rejected by the database. To improve the responsiveness, the same rule may be applied on the client or user-interface to give immediate feedback to the user as to whether the database is likely to accept or reject the input.

Figure 13:
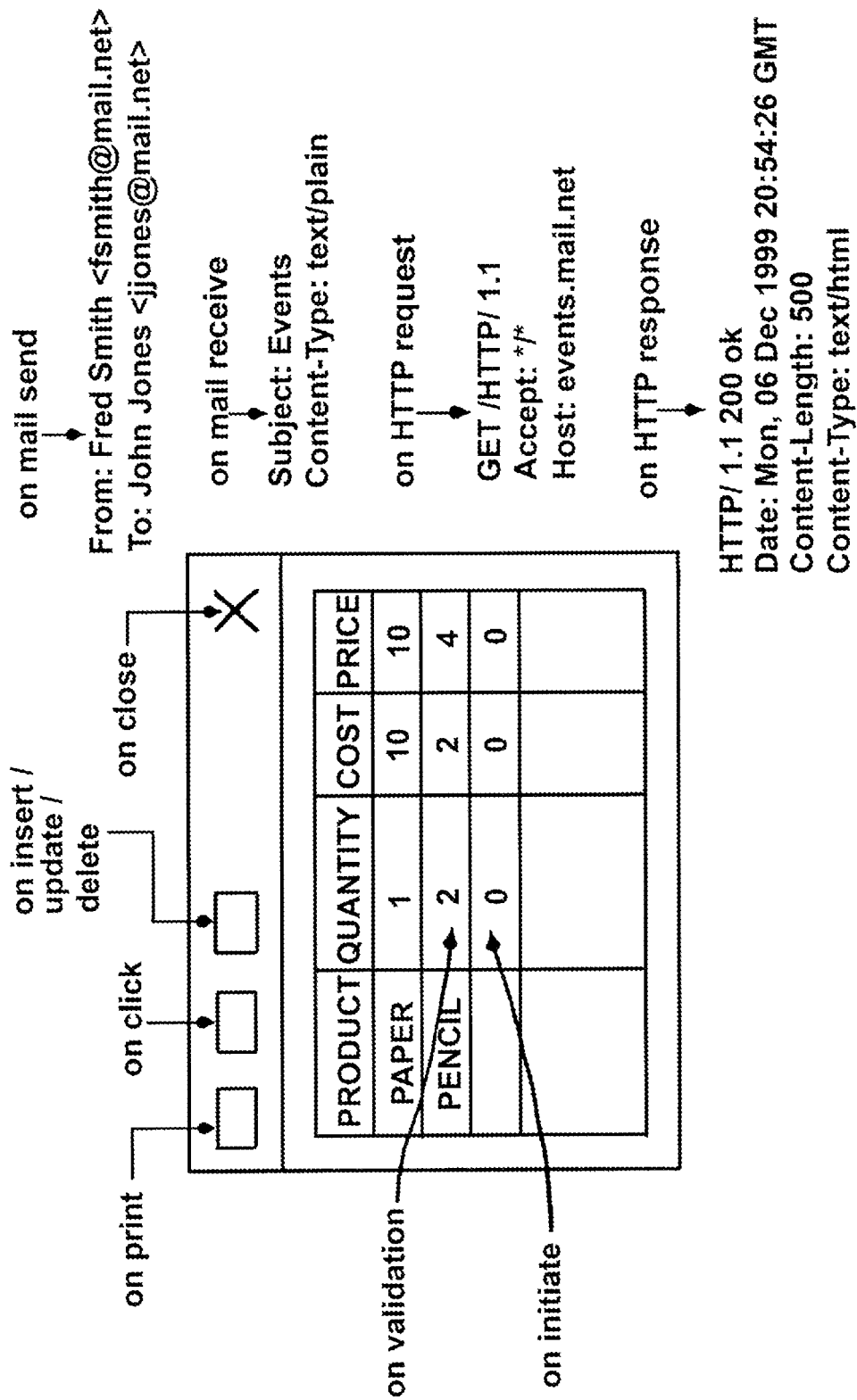
FIG. 13 illustrates an array of possible events available in user-interface.

User-interfaces tend to have a more comprehensive array of possible events as shown in FIG. 13. As the description progresses the reader will see that the present invention provides handlers which allow client and user-interface events to be bound to scripts in a manner consistent with the way in which table and field events are bound to scripts as described above.

In the present invention, the syntax of function wrappers, custom functions and event scripts is defined in XML. An example of a function wrapper was provided in FIGS. 12a and 12b. An example of a custom function is provided in FIGS. 14a, 14b and 14c. An example of an event script is provided in FIGS. 15a and 15b.

The next stage therefore in re-architecting the design of information systems is to provide functions and scripts in XML format which can be interpreted consistently from the database, user-interface or client.

Figure 16:
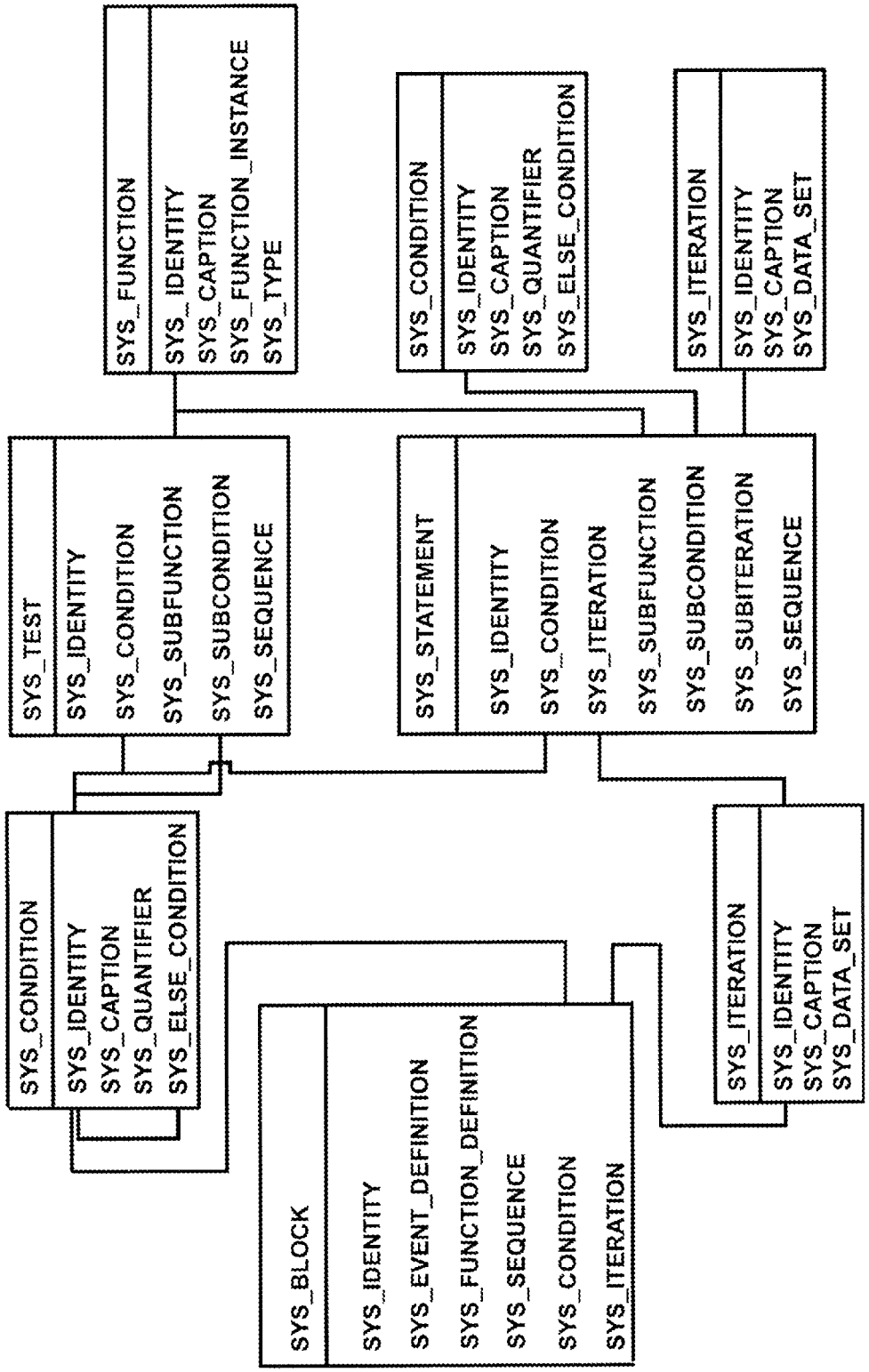
FIG. 16 illustrates how the constituent parts of a rule script are decomposed and organized into tables and fields.
Figure 17:
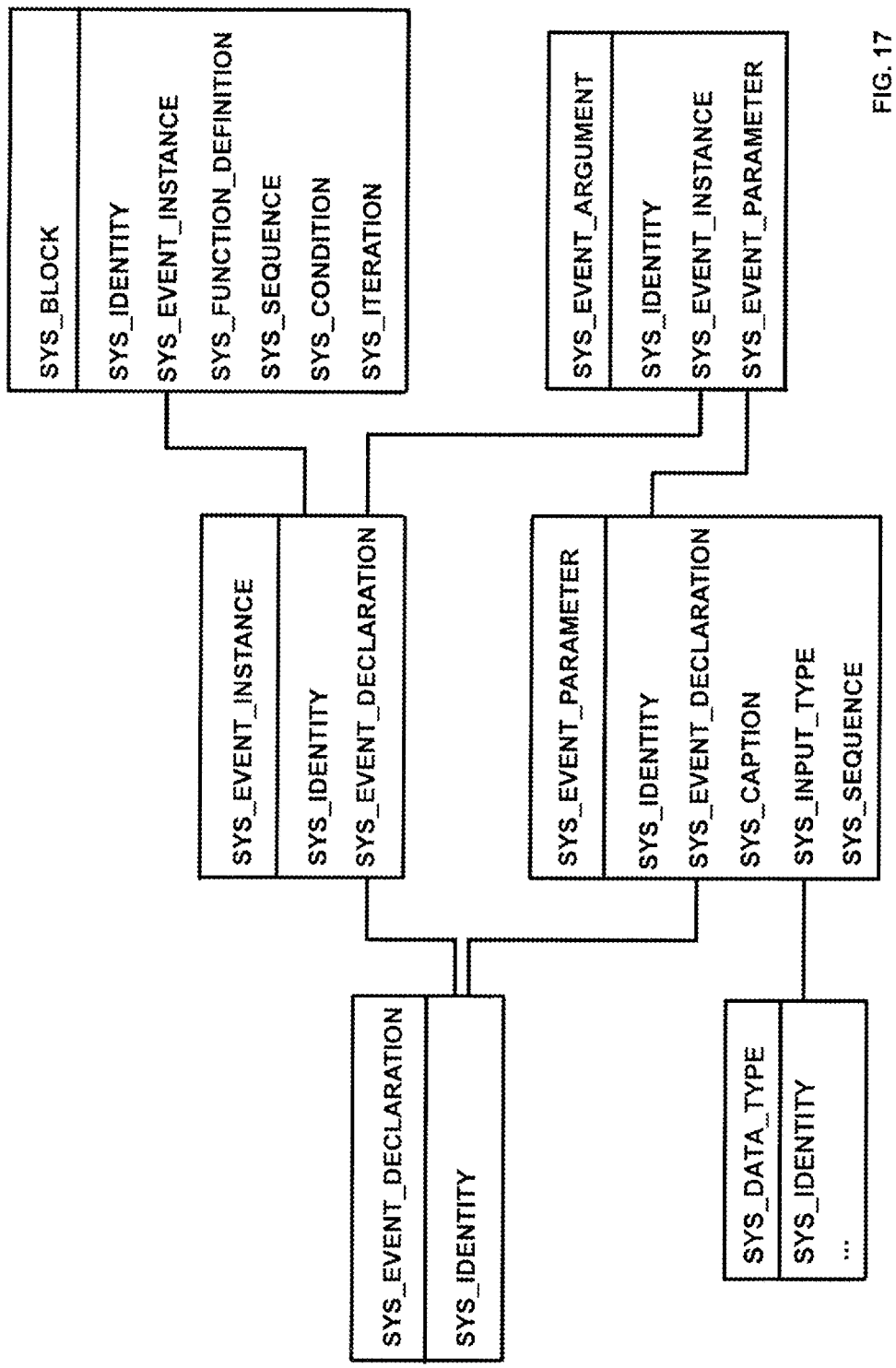
FIG. 17 illustrates how events are bound to scripts.
Figure 18:
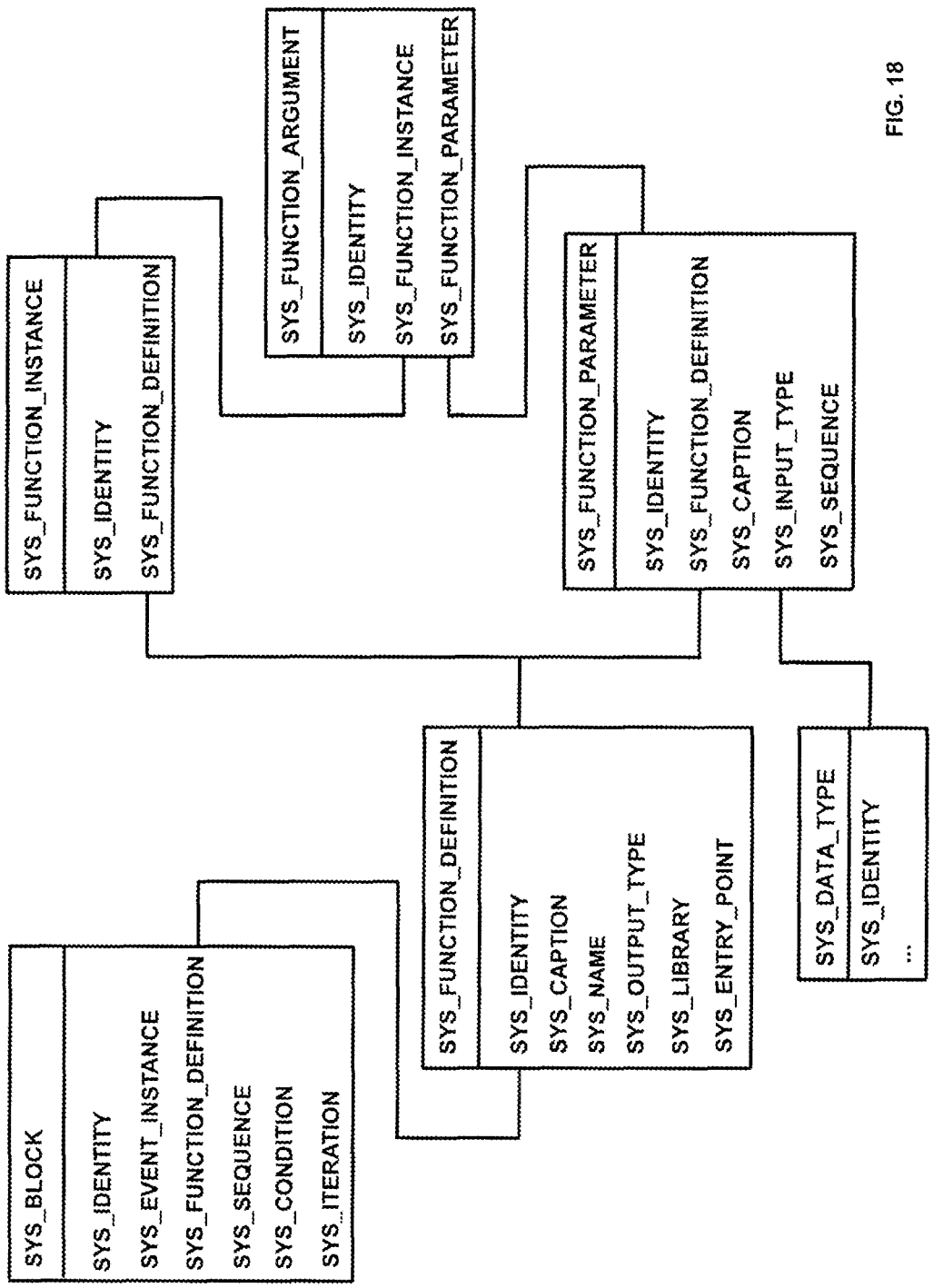
FIG. 18 illustrates how functions are bound to scripts.

From the XML definition of function wrappers, custom functions and event scripts, the present invention derives a set of data structures in which to store the constituent parts of a rule. This is shown in FIG. 16 which illustrates how the constituent parts of a rule script are decomposed and organized into tables and fields; FIG. 17 which illustrates how events are bound to scripts; FIG. 18 which illustrates how functions are bound to scripts; and FIG. 19 which illustrates how arguments used in function wrappers, custom functions and event scripts are defined for the scripts. These structures are discussed in more detail below.

Assume from this point in the description that the definition of all system and application tables created will be inserted into system table SYS_TABLE and that the definition of all system and application fields created will likewise be inserted into system table SYS_FIELD as described above. This means that each of the tables and fields in the set of data structures in which the present invention stores the constituent parts of a rule will be inserted into SYS_TABLE and SYS_FIELD respectively.

To produce the XML definitions of rules a stored procedure is employed within the database which collects the rule data from the data structures and generates the XML. The rule interpreter built into the database, illustrated in FIG. 10, can then load this XML, parse the XML and execute the script. Similarly, the rule interpreter in the clients and user-interfaces, also illustrated in FIG. 10, can also load this XML from the database, parse the XML and execute the script.

By decomposing the rules into its constituent parts and storing each part as a discrete entry in the database and imposing integrity constraints the present invention provides the further and more important benefit of ensuring that only those functions which return values of the correct or a compatible type can be used. FIG. 20 shows a field defined in an information system whose value is automatically generated. This is often called a formula field. If the data type of the field were defined as a double data type then, logically, the function which returns the value must return a double or a data type which can be cast to a double. Notice in FIG. 20 how the combination of the value of field UNIT_COST and the value of QUANTITY can be cast to a double. FIG. 21 shows an example of a formula field, DATE, whose data type, DATE, is incompatible with the assignment data type which is a DOUBLE. This would result in unpredictable behaviour. Likewise, a function may take a series of parameters with each parameter being a specific type as illustrated in FIG. 22. If the data type of a parameter were defined DATE data type then, logically, the argument value must be a DATE or a value which can be cast to a DATE. It is possible in interpreted languages for an argument in a function to be of a data type incompatible with the data type as defined by the parameter in the function declaration. In such a scenario, as illustrated in FIG. 22 where the first parameter requires a DATE data type but is inappropriately assigned a DOUBLE data type, this would result in unpredictable behaviour. However, the present invention removes all possibility of such errors from occurring by imposing integrity constraints.

An important feature of the present invention is that the integrity of the data used to define the rules, like all other data, is maintained thereby ensuring the correctness of the application. Because a rule script, decomposed into its constituent parts with each part stored as a discrete entry in the database, is unusual and difficult to achieve the explanation will show how scripts are decomposed, where the constituent parts are stored and the integrity constraints that must be applied.

FIG. 16 shows that table SYS_BLOCK contains foreign keys, as indicated by the lines, to SYS_CONDITION and SYS_ITERATION. A block may either be a condition or an iteration. If SYS_CONDITION is non-zero then SYS_ITERATION must be 0. If SYS_ITERATION is non-zero then SYS_CONDITION must be 0.

This is illustrated in a more usual way in FIG. 23 which shows the script as it is displayed in the user-interface and which points out the individual blocks in the script identifying the different condition blocks and the iteration blocks. In FIG. 23 there are three blocks with the first block an unconditional block, the second block an iteration block and the third block a conditional block.

In the interpreter, FIG. 10, if SYS_CONDITION is non-zero then the condition referenced will be executed and if SYS_ITERATION is non-zero then the iteration referenced will be executed.

A condition as defined in table SYS_CONDITION, shown in FIG. 16, may be one of two basic types. The first type is a condition in which there are tests which must evaluated and where the result of the evaluation determines whether the condition is passed. Such conditions may have quantifiers like "if all the following are true" or "if any of the following is true". The second basic type of condition has no tests and is always executed. This is very similar to a final else condition and in the present invention this is how it is executed. SYS_QUANTIFIER has a value corresponding to the type of condition. In the present invention a value of 0 in SYS_QUANTIFIER indicates that the condition has no tests and will always be executed.

This is illustrated in a more usual way in FIG. 23 which shows the script as it is displayed in the user-interface and which points out the conditions in the script. The reader will also see the "else" condition in FIG. 23 which is common to scripts.

When SYS_QUANTIFIER has a value other than 0 SYS_ELSE_CONDITION must be non-zero. As can be see from FIG. 16 SYS_ELSE_CONDITION is a foreign key pointing back to SYS_CONDITION. The meaning of this self-referencing is to identify the next condition in the block. The final "else" condition has a 0 in the SYS_ELSE_CONDITION field. This is illustrated in a more usual way in FIG.

24. Integrity rules not only ensure the rules described above but also that circular references do not occur.

Like modern programming languages, in the interpreter, FIG. 10, the first condition to return a value of true after executing the tests, described later, is the condition whose statements, also described later, will to be executed.

An iteration, as defined in table SYS_ITERATION, shown in FIG. 16, contains a foreign key reference to the dataset as defined in table SYS_DATA_SET. The iteration is executed in the interpreter as a loop over the dataset referenced. FIG. 25 helps to illustrate an iteration over a dataset.

FIG. 16 shows that SYS_TEST contains a foreign key to SYS_CONDITION. This is because a test always occurs within the context of a condition. Integrity rules ensure that an "else" condition does not have tests. A test may either be a function or another condition. If SYS_SUBFUNCTION is non-zero then SYS_SUBCONDITION must be 0. If SYS_SUBCONDITION is non-zero then SYS_SUBFUNCTION must be 0.

This is illustrated in the more usual way in FIG. 26 which shows a series of tests as they are displayed in the user-interface and which identifies the types of tests in the condition. Field SYS_SEQUENCE specifies the order in which the tests must be performed.

In the interpreter, FIG. 10, if SYS_SUBFUNCTION is non-zero then the function referenced will be executed and the boolean test value will be returned to the condition referenced in SYS_CONDITION and if SYS_SUBCONDITION is non-zero then the condition referenced will be executed and the boolean result of that condition will be returned to the condition referenced in SYS_CONDITION.

FIG. 16 shows that table SYS_STATEMENT contains foreign keys to SYS_CONDITION and SYS_ITERATION. A statement may be executed either within the context of a condition or an iteration. If SYS_CONDITION is non-zero then SYS_ITERATION must be 0. If SYS_ITERATION is non-zero then SYS_CONDITION must be 0.

This is illustrated in a more usual way in FIG. 23 which shows a statement as it is displayed in the user-interface within the context of a condition or an iteration. Field SYS_SEQUENCE specifies the order in which the statements must be performed.

FIG. 16 also shows that SYS_STATEMENT contains foreign keys SYS_SUBFUNCTION, SYS_SUBCONDITION and SYS_SUBITERATION. A statement may be one of a function, a condition or an iteration. If SYS_SUBFUNCTION is non-zero then SYS_SUBCONDITION and SYS_SUBITERATION must be 0. If SYS_SUBCONDITION is non-zero then SYS_SUBFUNCTION and SYS_SUBITERATION must be 0. If SYS_SUBITERATION is non-zero then SYS_SUBFUNCTION and SYS_SUBCONDITION must be 0.

This is illustrated in a more usual way in FIG. 27 which shows three statements, a function, a condition and an iteration within the context of a condition as they are displayed in the user-interface. Field SYS_SEQUENCE specifies the order in which the statements must be performed.

In the interpreter, FIG. 10, if SYS_SUBFUNCTION is non-zero then the function referenced will be executed; if SYS_SUBCONDITION is non-zero then the condition referenced will be executed; and if SYS_SUBITERATION is non-zero then the iteration referenced will be executed.

In the paragraphs above, the explanation has stated that a function will be executed by the interpreter. A function, whether it is a function wrapper or a custom function has a list of parameters as illustrated in FIGS. 12a and 12b. Each parameter lists only the data type and its position. This is shown in FIG. 18 where table SYS_FUNCTION_PARAMETER has a foreign key field, SYS_INPUT_TYPE, which stores the data type and a field, SYS_SEQUENCE, which stores the position of the parameter in the parameter list. Rules maintain the integrity of the data by ensuring that the value in field SYS_INPUT_TYPE references a data type as listed in table, SYS_DATA_TYPE, and that each parameter in the list of parameters for a function has a unique sequence number as identified by SYS_SEQUENCE.

Figure 28:
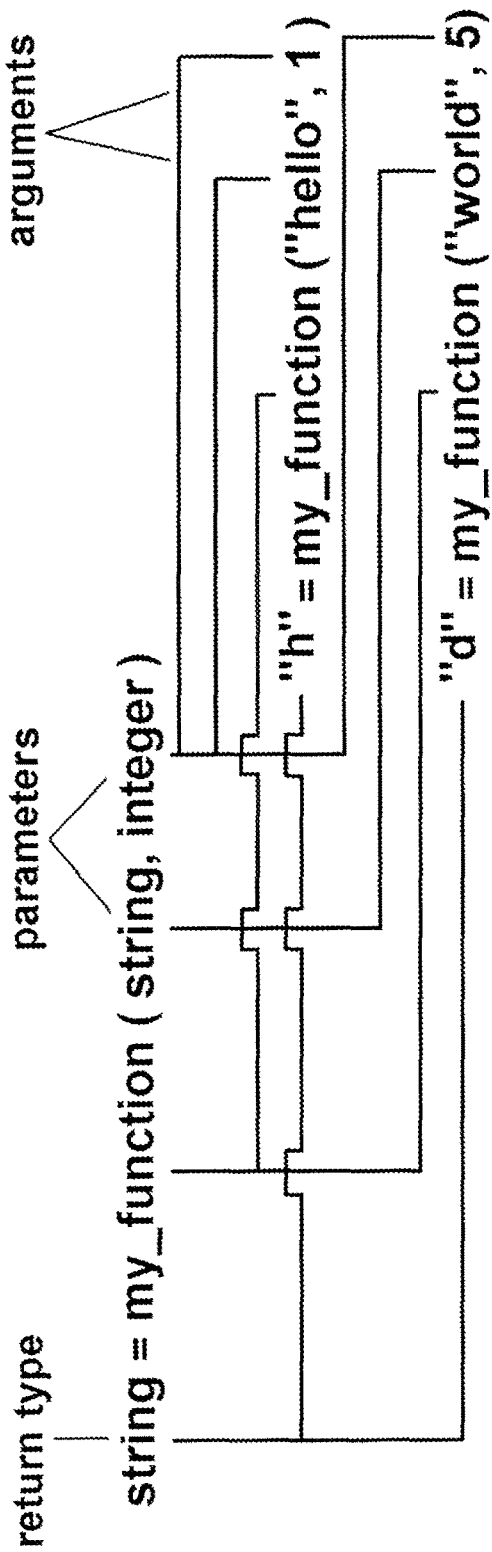
FIG. 28 illustrates how function parameters are populated by argument values.

When a function is called, the parameters are populated by argument values. This is illustrated in FIG. 28 where the parameters of function definitions need to be populated by argument values in the two callable instances of functions. Individual function arguments are listed in table SYS_FUNCTION_ARGUMENT shown in FIG. 18. In table SYS_FUNCTION_ARGUMENT, field SYS_FUNCTION_INSTANCE is a foreign key to the callable instance of the function in which the argument is used. Field SYS_FUNCTION_PARAMETER is a foreign key which identifies the parameter that the argument represents. The value of each argument in each function instance is defined as a reference in table SYS_REFERENCE shown in FIG. 19.

Integrity rules ensure that the data type of the reference as listed in table SYS_REFERENCE is compatible with the data type of the parameter as listed in field SYS_INPUT_TYPE of table SYS_FUNCTION_PARAMETER. This resolves the issue of compatible data types which were described above and illustrated in FIG. 20 and FIG. 21.

Figure 19:
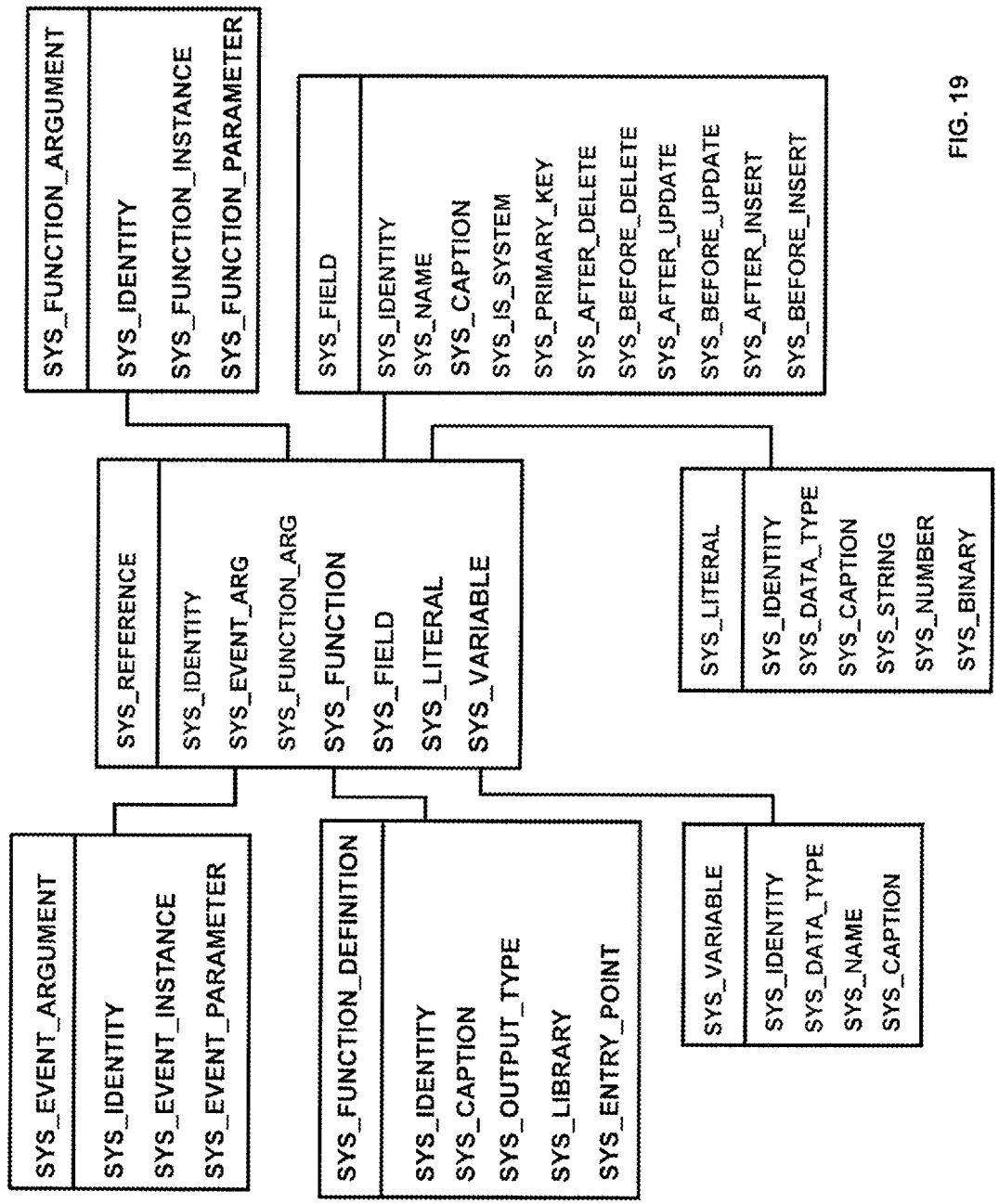
FIG. 19 illustrates how arguments used in function wrappers, custom functions and event scripts are defined for scripts.

FIG. 19 shows that SYS_REFERENCE contains nothing but foreign keys. These foreign keys refer to the argument data passed into the functions. The value of a function argument can be derived from only one source. The source must be one of a field value, a literal value, a global variable or the result of a function instance. If the source is the value of a field then field SYS_FIELD references a valid field in table SYS_FIELD and fields SYS_LITERAL, SYS_VARIABLE and SYS_FUNCTION are 0. If the source is the value of a literal value then field SYS_LITERAL references a valid literal in table SYS_LITERAL and SYS_FIELD, SYS_VARIABLE and SYS_FUNCTION are 0. If the source is the value of a variable then field SYS_VARIABLE references a valid variable in table SYS_VARIABLE and SYS_FIELD, SYS_LITERAL and SYS_FUNCTION are 0. If the source is the value of a result from a function then field SYS_FUNCTION references a valid function as listed in table SYS_FUNCTION_INSTANCE and SYS_FIELD, SYS_LITERAL and SYS_VARIABLE are 0.

Figure 31:
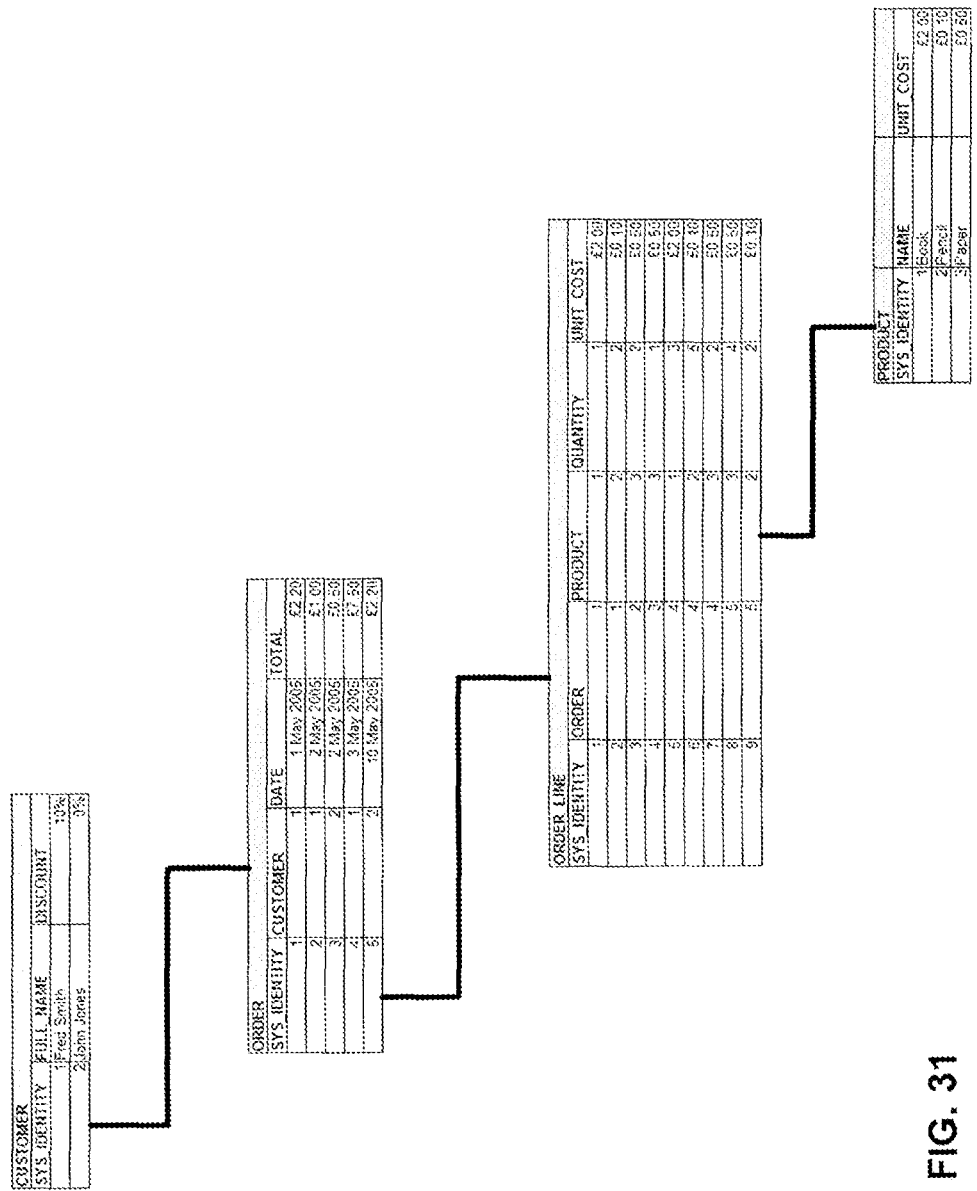
FIG. 31 illustrates navigating table relationships to provide context.

Fields are listed in the system table, SYS_FIELD. Field SYS_TABLE in table SYS_FIELD identifies the name of the table of the field referenced in SYS_REFERENCE. Context identifies the record that provides the value of the argument. Relationship rules between tables provide the context. The relationships provide a list of the available tables and the links between these tables. With the available links, context is able to navigate the database table structure to access records in tables related to the record being manipulated. This is illustrated in FIG. 31. For example, if an event executing on ORDER where SYS_IDENTITY=4 needs to access the value of the field DISCOUNT in table CUSTOMER then context is aware of the relationship between tables ORDER and CUSTOMER and knows that the current ORDER record is related to the record in CUSTOMER where CUSTOMER.SYS_IDENTITY=1 by the foreign key reference in ORDER.CUSTOMER. Similarly, if an event executing on ORDER where SYS_IDENTITY=4 needs to sum up the value of the fields QUANTITY and UNIT_COST in table ORDER_LINE then context is aware of the relationship between tables ORDER and ORDER_LINE and knows that the current ORDER record is related the list of records in ORDER_LINE where ORDER_LINE.ORDER=4 which in FIG. 31 references three records where ORDER_LINE=5, 6, and 7. Events and the sender argument of the event are described below.

Literal values are stored in the system table, SYS_LITERAL. Table SYS_LITERAL is described in FIG. 29a. It stores the data type of the value in field SYS_DATA_TYPE which is a foreign key referencing table SYS_DATA_TYPE and the user-friendly name in field SYS_CAPTION. The value of the literal value is stored in fields SYS_STRING, SYS_NUMBER or SYS_BINARY. If the data type of the literal value is a type of string then the value is stored in field SYS_STRING and fields SYS_NUMBER and SYS_BINARY are left empty. If the data type of the literal value is a type of number then the value is stored in field SYS_NUMBER and fields SYS_STRING and SYS_BINARY are left empty. If the data type of the literal value is a type of binary then the value is stored in field SYS_BINARY and fields SYS_NUMBER and SYS_STRING are left empty. FIG. 29b shows some example literal values.

Figures 30A, 30B:
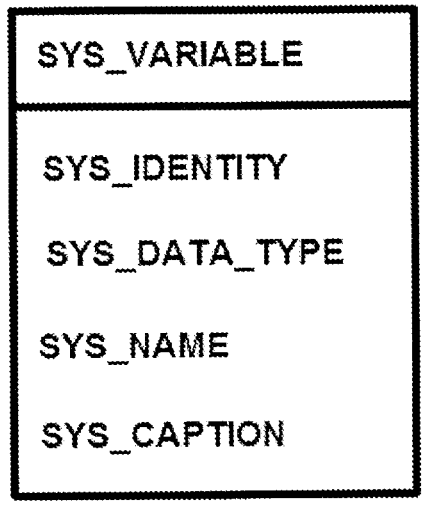
FIGS. 30A-30B illustrate the data structure, SYS_VARIABLE.

Variable values are stored in the system table, SYS_VARIABLE. Table SYS_VARIABLE, is described in FIG. 30a and stores the data type of the variable in field SYS_DATA_TYPE which is a foreign key referencing table SYS_DATA_TYPE, the internal name of the variable in field SYS_NAME and the user-friendly name in field SYS_CAPTION. FIG. 30b shows some example variables which are programmatically available within the Firebird database.

Function return values are dynamically calculated when a function is executed. FIG. 18 shows field SYS_OUTPUT_TYPE of table SYS_FUNCTION_DEFINITION which is a reference to the data type of the function's return value. This is also illustrated in FIG. 28.

To perform any useful work a script must call compiled functions. While function wrappers call compiled functions directly, custom functions must call compiled functions indirectly. The task of the interpreter is to parse the function wrapper and custom functions and to call the compiled functions as described in FIG. 10. The library and name of the compiled function is stored in fields SYS_LIBRARY and SYS_ENTRY_POINT in table SYS_FUNCTION_DEFINITION which is illustrated in FIGS. 18 11A-11C. With this information the interpreter is able to call the interpreted function passing the correct arguments and accepting the appropriate return value data type.

Custom functions differ from function wrappers in that they comprise a definition which, in turn, comprises a collection of blocks as illustrated in FIG. 18 where table SYS_BLOCK has a foreign key reference, SYS_FUNCTION_DEFINITION, to the function definition of which they are a member as listed in table SYS_FUNCTION_DEFINITION. Individual blocks are executed as described above. While the same function may appear as multiple instances in multiple events and custom functions the definition of those function instances is identical.

FIG. 18 shows that individual function instances are listed in table SYS_FUNCTION_INSTANCE where each instance has potentially separate argument values as explained above and has a reference in filed SYS_FUNCTION_DEFINITION to the function definition of which it is an instance.

Having described functions in detail above the explanation of events follows an identical logic to that of functions as illustrated in FIG. 17 with the exception that, unlike functions, there are no event wrappers to compare to function wrappers. Instead, all events are customized instances which cannot be re-used in other event instances. FIG. 17 illustrates that table SYS_BLOCK contains a foreign key reference field, SYS_EVENT_INSTANCE, to the event instance of which they are a member as listed in table SYS_EVENT_INSTANCE rather than a function definition as explained about functions above.

Because the present invention uses event-driven programming paradigm this means that all scripts are executed as a result of some event as described in FIG. 13. Different types of events have different parameters as is common in event-driven applications. One noteworthy feature of events is the parameter which identifies the sender of the event and the parameter which identifies the identity of the transaction both of which contribute to context and acid compliance, Atomicity, Consistency, Isolation, and Durability.

Other than these differences, the explanation of events in the present invention follows the same path as that of functions and the reader is directed to that explanation for an understanding of event handling.

The modified architecture so far demonstrates that while information systems differ in the types of their rules, all information systems use rules. The present invention therefore discards the concept of embedding or compiling rule scripts in the database and the clients or user-interfaces as illustrated in FIG. 1 in preference for rules decomposed and stored as data in the database as shown in FIG. 10. By providing a rule interpreter to the database which can load and execute rules the present invention nudges the database file from an application-specific file with rules defined in procedural SQL and embedded in the database to a generic database where only rule data differs. By providing rule interpreters to the client and user-interface programs which can load and execute rules the present invention nudges the clients and user-interfaces from an application-specific client with rules embedded in the client and user-interface to a generic information system client or user-interface program where the application-specific logic is stored in the database and loaded from the database when the client or user-interface program connects to the database. That it is unusual to see rule scripts fully decomposed is the reason the description went to such lengths to describe the structures in which the discrete entries are stored and the validations imposed.

By decomposing the rules into discrete values in the database and applying integrity checking to each part of the rules such that the rules can be assured of correctness the present invention, so far, ensures that at least the rules can be assured of correctness irrespective of whatever changes the system is subjected to.

FIG. 1 illustrates that in the traditional architecture of information systems data sets and their constituent parts, entities, columns, joins and filters, can be stored in the database, in the client or user-interface or a combination of all of these. When a data set is defined in the database, usually expressed in SQL, structured query language, an example of which appears in FIG. 32, some databases ensure, on initial creation and even later adaptation of the data set, that the data set definition refers to actual tables and fields in the database and reject table and field changes to the database where this would affect a dependent data set. Other databases, on the other hand, do not provide such validations. Some databases even ensure, on later adaptation of tables and fields, that such changes do not affect defined data sets and reject any changes to tables and fields that would break the integrity of data sets such that they would fail to run. Some databases even go so far as to ensure the validity of functions used in the data set filter, shown in FIG. 32 with the functions is_later_date( ) and is_false( ). Other databases do not provide such validations.

Defining data sets in the database is appropriate for static data sets and defining data sets in the client or user-interface is appropriate for dynamic data sets. Both static and dynamic data sets are useful in information systems.

Given that data sets can reasonably be defined in the database or the client or user-interface the issue remains that the correctness of a data set is unknown until runtime if it is defined in the client or user-interface and, in some databases, even when it is defined in the database itself.

To resolve this issue the present invention proposes that instead of defining a data set as a block of text, as shown in FIG. 32, which is parsed out into its constituent parts at runtime by the database API, the definition of a data set be decomposed into its constituent parts with each part stored as a discrete entry in the database.

Figure 33:
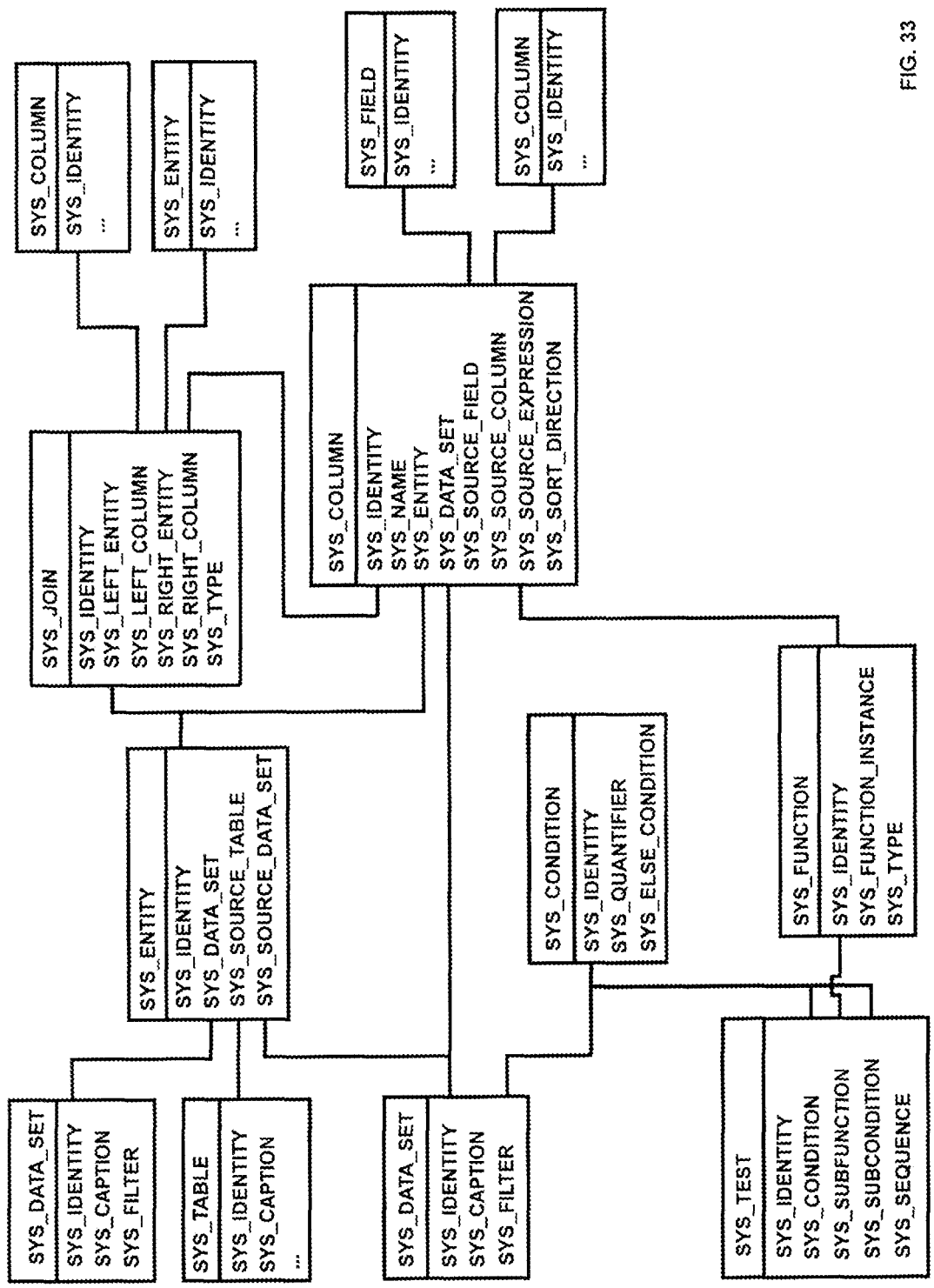
FIG. 33 illustrates how the constituent parts of a data set are decomposed and organized into tables and fields.

FIG. 32 illustrates the constitution of a data set. From this structure, the present invention derives a set of data structures in which to store the constituent parts of a data set. This is illustrated in FIG. 33. The ellipsis marks in FIG. 33 and other diagrams are used to save space and refer to fields which have not been repeated but which are described in elsewhere in this description. The structure of data sets will now be explained.

The system field, SYS_FILTER, in system table SYS_DATA_SET is a foreign key to the primary key system field SYS_IDENTITY in system table SYS_CONDITION described above in rules. This is because a filter is a condition and, like other conditions, the results of the tests specified in table SYS_TEST identify which rows in the source table or source data set qualify for inclusion in the data set.

An entity, defined in SYS_ENTITY, identifies the table or data set that the data is to be taken from. The source of the entity may be either a table defined in table SYS_TABLE or a data set defined in table SYS_DATA_SET. The system field SYS_SOURCE_TABLE in system table SYS_ENTITY is a foreign key to the primary key in table SYS_TABLE and the system field SYS_SOURCE_DATA_SET in system table SYS_ENTITY is a foreign key to the primary key in table SYS_DATA_SET. If the source of the data is a table then SYSSOURCE_DATA_SET is set to 0. If the source of the data is a data set then SYS_SOURCE_TABLE is set to 0.

A column, defined in the system table SYS_COLUMN, identifies the field, column or expression that provides the data. The source of the column may be a field defined in SYS_SOURCE_FIELD which is a foreign key to the primary key in table SYS_FIELD; the source may be a column defined in SYS_SOURCE_COLUMN which is a foreign key to the primary key in table SYS_COLUMN or the source may be an expression defined in SYS_SOURCE_EXPRESSION which is a foreign key to the primary key in SYS_FUNCTION_INSTANCE described above. If the source of the data is a field then SYS_SOURCE_COLUMN and SYS_SOURCE_EXPRESSION are set to 0. If the source of the data is a column then SYS_SOURCE_FIELD and SYS_SOURCE_EXPRESSION are set to 0. If the source of the data is an expression then SYS_SOURCE_FIELD and SYS_SOURCE_COLUMN are set to 0.

If the source of an entity is a table then the source of each column in that entity must be either a field or an expression. If the source of an entity is a data set then the source of each column in that entity must be either a column or an expression. Integrity checks enforce these rules.

A join between entities, defined in the system table SYS_JOIN, identifies the two entities comprising the join and the two columns in each of those entities that are joined. The system field SYS_LEFT_ENTITY in system table SYS_ JOIN is a foreign key to the primary key in system table SYS_ENTITY and the system field SYS_RIGHT_ENTITY in system table SYS_JOIN is also a foreign key to the primary key in system table SYS_ENTITY. The system field SYS_LEFT_COLUMN in system table SYS_JOIN is a foreign key to the primary key in system table SYS_COLUMN and the system field SYS_RIGHT_COLUMN in system table SYS_JOIN is also a foreign key to the primary key in system table SYS_COLUMN. The column defined in field SYS_LEFT_COLUMN of table SYS_JOIN must be a member of the entity defined in field SYS_LEFT_ENTITY of table SYS_JOIN as listed in table SYS_ENTITY. The column defined in field SYS_RIGHT_COLUMN of table SYS_JOIN must be a member of the entity defined in field SYS_RIGHT_ENTITY of table SYS_JOIN as listed in table SYS_ENTITY. The field, SYS_TYPE identifies the type of join which might be an inner join, a left outer join, a right outer join, a union or one of the many other types of joins. Rules ensure that the integrity described above is maintained.

Before a data set can be run the SQL needs to be generated from the definition stored in the data structures. A stored procedure in the database is used to assemble the constituent parts of the data set and generate the SQL.

Where a data set is required by a rule script, in particular one which comprises an iteration, then the SQL generated by the stored procedure can then executed by the interpreter.

The present invention abandons the concept of static SQL defined in the database and dynamic SQL mixed in with programming code in the client and user-interface and, in their place, provides a data set class in the clients and user-interfaces which loads the SQL from the database. This SQL is passed back to the database API as the data set definition which returns a set of data to the clients and user-interfaces in accordance with the SQL request.

Figure 51:
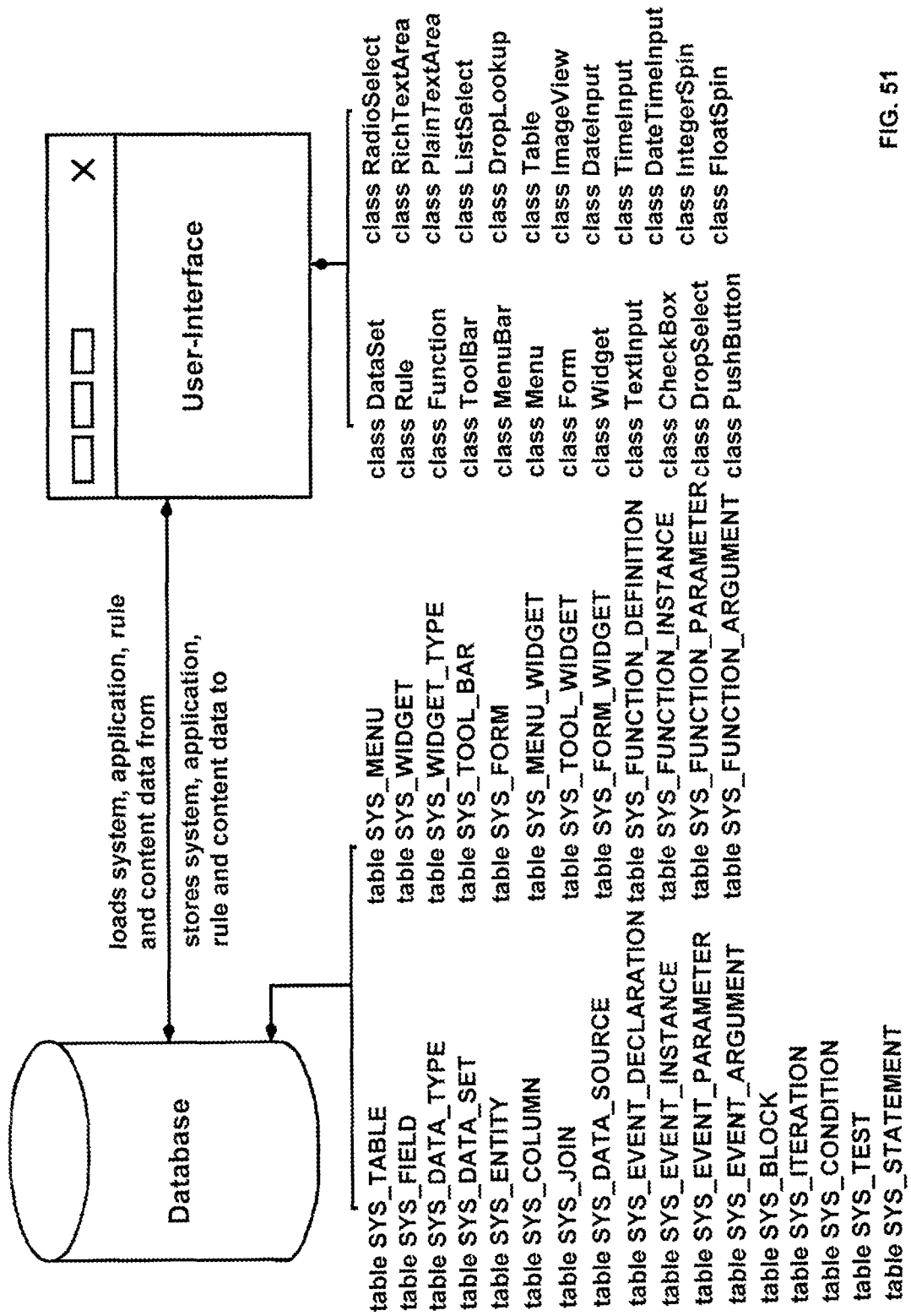
FIG. 51 illustrates the architecture of present invention.

This provision of a class in the user-interface or client which can create instances of objects whose customizable properties are loaded from values loaded from the database is a core architectural characteristic of the present invention and illustrated in FIG. 34*a*, 34*b* and FIG. 51.

The definitions of data sets are no longer stored optionally in the database and the clients or user-interfaces. Instead, the definitions are always stored in the database. Further, that the storage of a data set definition in the database is no longer stored as a block of text as shown in FIG. 32 but decomposed into its constituent parts with each part stored as discrete entries in the database as illustrated in FIG. 33. By imposing integrity constraints the architecture can ensure the correctness of the data sets irrespective of whatever changes the system is subjected to.

A stored procedure exists in the database which assembles the SQL from the structures. If the script interpreter built into the database needs a data set in order to execute a rule then the interpreter can load the generated SQL which can then be executed. Finally, there exists a data set class in the clients and user-interfaces designed to load not only the constituent parts but also the generated SQL of that dataset from database which can be used in a call back to the database API which the database returns as a set of data in accordance with the SQL request called the data set.

The reader will be familiar with the concepts of object-orientated programming with its classes and objects and with the concepts of database design with its tables and records. An important feature of the present invention is that the classes in the client and user-interface have a correlation to the tables in the database. The present invention distinguishes customizable properties from public properties of object orientated classes in that customizable properties are designed to be populated with data loaded from the database whereas public properties are designed to be accessible by other classes.

This is illustrated in FIG. 34a which shows a table with fields to store the customizable properties of PushButton object instances. The reader will note the correlation between the table, SYS_PUSHBUTTON, and the class PushButton and, in particular, the correlation between the fields in table SYS_PUSHBUTTON and the public properties of class PushButton. FIG. 34b shows how records in table SYS_PUSHBUTTON correlation to object instances of the class PushButton where customizable properties are loaded from the table and set in the object instances. In FIG. 34b, such customizable properties include the caption and icon.

By providing a data set class in the clients and user-interfaces which can load any SQL statement the present invention nudges the clients and user-interfaces from an application-specific client to a generic information system client program where the application-specific logic is stored in the database and loaded from the database when the client program connects to the database. The completed client and user-interface program shown in FIG. 51 is compared with the traditional client and user-interface application shown in FIG. 1.

Figure 35:
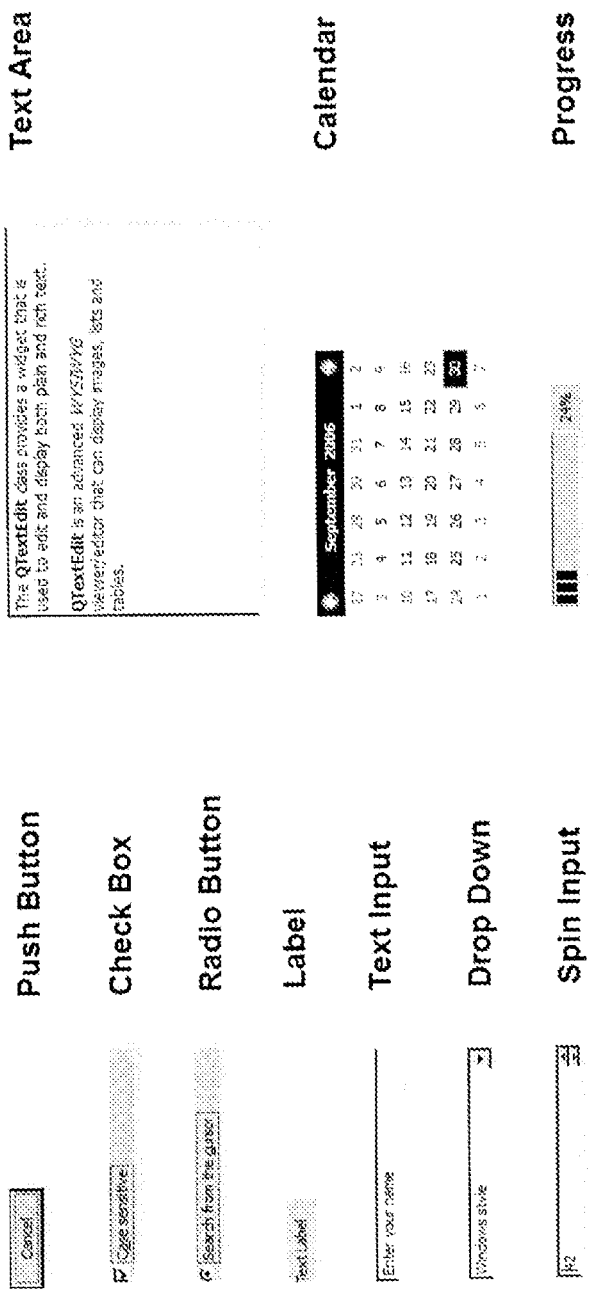
FIG. 35 illustrates a selection of various widgets so that the reader understands the meaning assigned by the present invention to the term widget.

FIG. 1 illustrates that widgets, whether they are form widgets, menu widgets or tool widgets, are always a feature of the user-interface. A widget is an interface element that a computer user-interacts with. FIG. 35 shows a selection of various widgets so that the reader understands the meaning assigned by the present invention to the term widget. All information system architectures provide a selection of widget types or classes which can appear on forms, menus and toolbars. The widgets that appear on forms, menus and toolbars are instances or objects of a specific widget type class. Almost all types of widgets provide custom behaviour. Such behaviour may include the caption on a label and the event script bound to a push button click. Unlike the traditional architecture of information systems where instances and behaviour of each widget is compiled into or stored in the user-interface the present invention stores the instances and behaviour of each widget in the database. The customizable properties of each widget type is decomposed in the database with each widget type occupying a separate structure, with individual fields to store the values of individual customizable properties of the widget. Each instance of that widget type is stored as a separate record in the structure.

The list of widgets available in the user-interface is stored in the database in table SYS_WIDGET_TYPE illustrated in FIG. 36. Each record in SYS_WIDGET_TYPE stores the caption, the icon of the widget type and, more importantly, the class name in which that widget type is defined and the library in which the class is made available if the widget definition exists in a library plugged into the user-interface.

Figure 37:
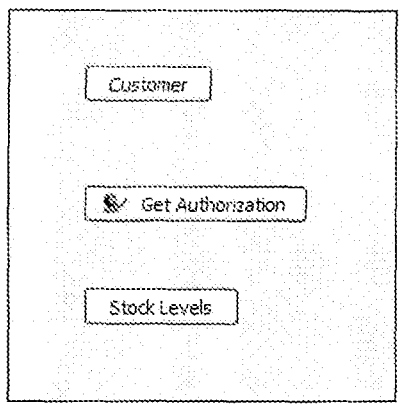
FIG. 37 illustrates the table, SYS_PUSHBUTTON.

FIG. 37 shows the table for a push button widget, SYS_PUSHBUTTON, which stores the customizable properties for the PushButton widget class. Each instance of PushButton which appears in the user-interfaces loads its properties from a record stored in table SYS_PUSHBUTTON providing each instance with customizable behaviour. As can be seen from FIG. 37, field SYS_CAPTION becomes the caption on the button, SYS_ICON becomes the icon for the button if it is not null and SYS_ON_CLICK becomes the custom script to be executed on the click event. Like all widgets, SYS_PUSHBUTTON contains a foreign key field, SYS_WIDGET, which references table SYS_WIDGET.

FIG. 38 shows the table SYS_WIDGET which is the complete list of all the widgets defined in the database. This master list of widgets has the field SYS_WIDGET_TYPE which is a foreign key identifying the type of widget as listed in table SYS_WIDGET_TYPE such that if a type of widget is removed from the system and deleted from SYS_WIDGET_TYPE all instances of that widget would be removed from SYS_WIDGET. The field SYS_COLUMN is a foreign key to table SYS_COLUMN such that a widget designed to edit data is aware of the source of its data. This reference ensures that if a column is renamed or deleted from table SYS_COLUMN the reference in SYS_WIDGET is updated or removed accordingly.

Figure 39:
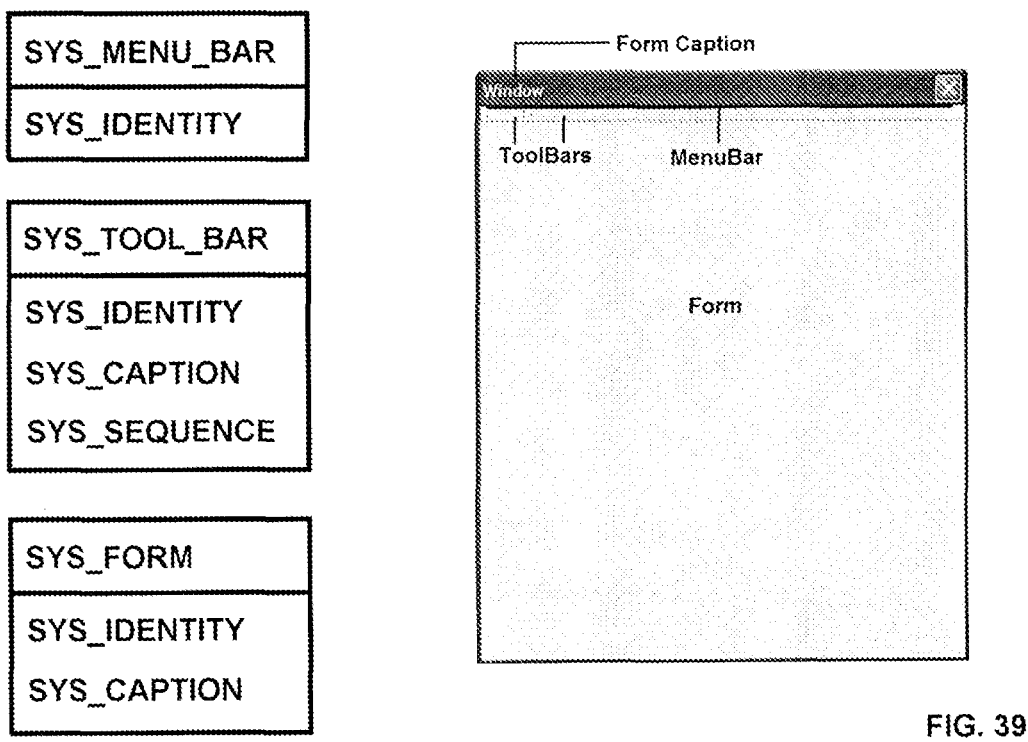
FIG. 39 illustrates instances of classes Form, MenuBar, ToolBar load their customizable property values from records in the tables SYS_FORM, SYS_MENU_BAR and SYS_TOOL_BAR respectively.

The user-interfaces of most information systems comprise form, menubar and toolbar features. The list of forms, menubars and toolbars available in the user-interface are stored in the tables, SYS_FORM, SYS_MENU_BAR and SYS_TOOL_BAR respectively. Individual instances of forms of class Form, menubars of class MenuBar and toolbars of class ToolBar available in the user-interface load their customizable property values from records in the tables SYS_FORM, SYS_MENU_BAR and SYS_TOOL_BAR respectively. This is illustrated in FIG. 39.

One application can contain many top-level windows with each top-level window having a separate menu bar. Each menu bar is listed in SYS_MENU_BAR. Each menubar can contain many menus. SYS_MENU, therefore, contains a foreign key field, SYS_MENU_BAR, which references the menubar which the menu belongs to. Referential integrity rules ensure that a menu does belong to an existing menu and that if a menubar is deleted from SYS_MENU_BAR that the menus listed in SYS_MENU and which belong to the menubar being deleted are in turn deleted ensuring that dangling menus never exist.

Figure 40:
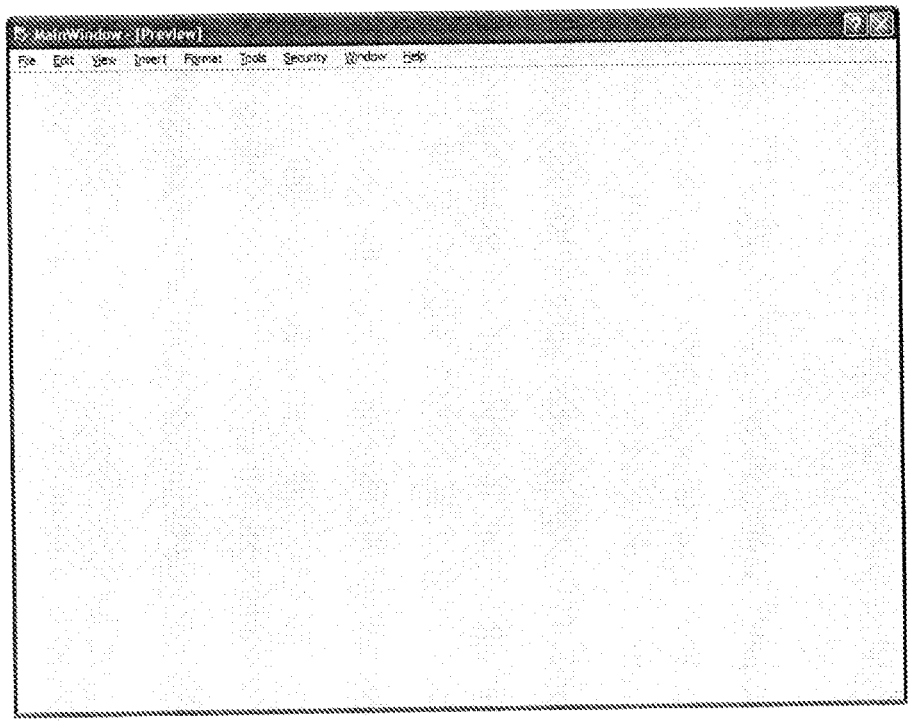
FIG. 40 illustrates instances of class Menu load their customizable property values from records in the tables SYS_MENU.

The list of menus available in the user-interface are stored in the database table, SYS_MENU. Each record in the table SYS_MENU stores the customizable properties for the individual object instances of class Menu, shown in FIG. 40, to be displayed in the user-interface.

Having in the previous paragraphs described widgets separately from menus, toolbars and forms the description will now describe how these are combined. FIG. 41a illustrates a menu which contains a number of widgets. FIG. 41b shows a toolbar which also contains a number of widgets. FIG. 41c likewise shows a form which contains a number of widgets.

Figure 42:
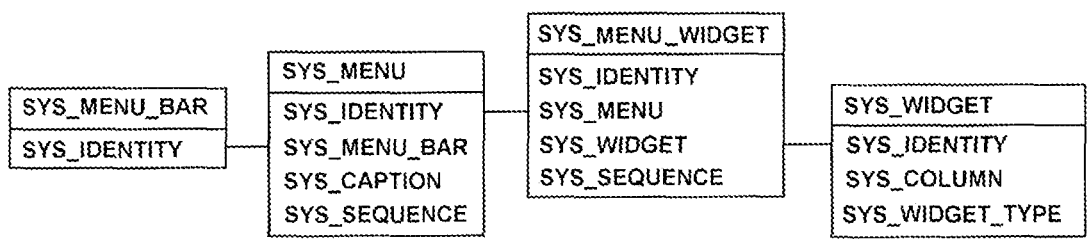
FIG. 42 illustrates the relationship between SYS_MENU_BAR, SYS_MENU, SYS_MENU_WIDGET and SYS_WIDGET.

The table, SYS_MENU_WIDGET, illustrated in FIG. 42, stores the list of widgets which are contained on individual menus. The foreign key, SYS_WIDGET, is a reference to the widget in table SYS_WIDGET that appears on the menu identified by the field SYS_MENU which is a foreign key referring to the menu in Mable SYS_MENU. The field SYS_SEQUENCE specifies the order that the widgets appear on the menu.

Figure 43:
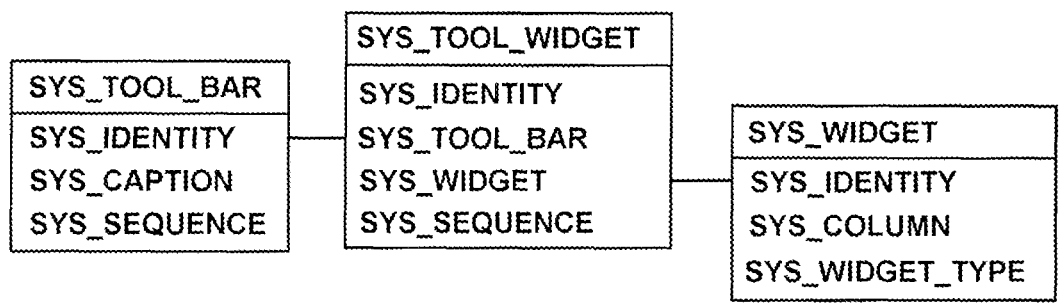
FIG. 43 illustrates the relationship between SYS_TOOL_BAR, SYS_TOOL_WIDGET and SYS_WIDGET.

The table, SYS_TOOL_WIDGET illustrated in FIG. 43, stores the list of widgets which are contained on individual toolbars. The foreign key, SYS_WIDGET, is a reference to the widget in table SYS_WIDGET that appears on the toolbar identified by the field SYS_TOOL_BAR which is a foreign key referring to the toolbar in table SYS_TOOL_BAR. The field SYS_SEQUENCE specifies the order that the widgets appear on the toolbar.

Figure 44:
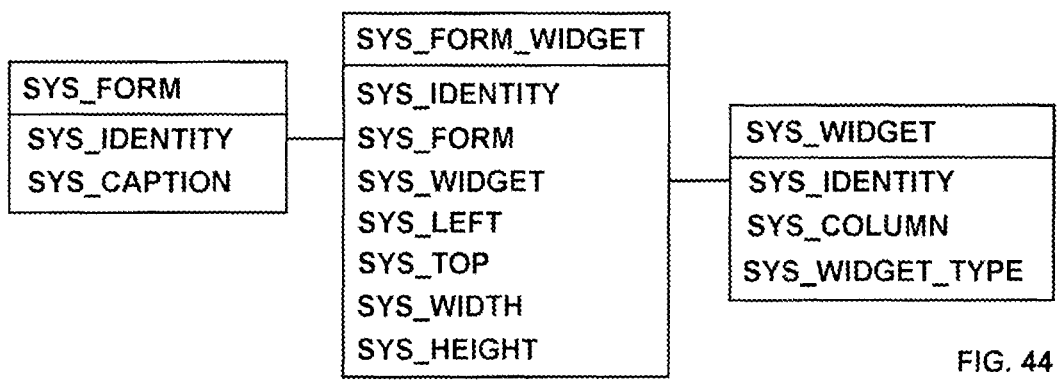
FIG. 44 illustrates the relationship between SYS_FORM, SYS_FORM_WIDGET and SYS_WIDGET.

The table, SYS_FORM_WIDGET illustrated in FIG. 44, stores the list of widgets which are contained on individual forms. The foreign key, SYS_WIDGET, is a reference to the widget in table SYS_WIDGET that appears on the form identified by the field SYS_FORM which is a foreign key referring to the form in table SYS_FORM. The fields, SYS_LEFT, SYS_TOP, SYS_WIDTH and SYS_HEIGHT specify the position of the widget on the form.

In the architecture of the present invention the customizable properties of widgets are no longer stored in the user-interface but in the database. This does not mean that all the properties of widget instances need be stored in the database. It is only those properties which need to be customized by the application that need be stored in the database. These customizable property values of each widget type instance are stored in fields in the database and there exists widget classes in the user-interface designed to load the customizable properties from the database and create customized object instances of those widgets as illustrated in FIGS. 34a and 34b.

Likewise, the customizable properties of forms, menubars and toolbars are no longer stored in the user-interface but in fields in the database and there exists form, menubar and toolbar classes in the user-interface designed to load the customizable properties from the database and create customized objects instances of those forms, menubars and toolbars as illustrated in FIGS. 34a and 34b.

The customizable properties of menus on menubars and widgets on menus, widgets on toolbars and widgets on forms are no longer stored in the user-interface but in fields in the database and there exists a menu class in the user-interface designed to load the customizable properties from the database and create customized object instances of those menus as illustrated in FIGS. 34a and 34b.

The modified architecture so far demonstrates that while information systems differ in the number and design of their widgets, forms, menubars, menus, and toolbars all information systems use widgets, forms, menubars, menus and toolbars. The present invention therefore discards the concept of embedding the definition of widgets, forms, menubars, menus, and toolbars in the user-interface in preference for decomposing the customizable properties and storing them as data in the database. By providing widget, form, menubar, menu, and toolbar classes in the user-interface which can load their custom property definitions from the database the present invention nudges the user-interface from an application-specific client to a generic information system client program where the application-specific logic is stored in the database and loaded from the database when the user-interface program connects to the database. The completed user-interface program shown in FIG. 51 is compared with the traditional user-interface application shown in FIG. 1.

By imposing rules on the structures, the present invention makes it easy to identify dependencies and to conclusively verify the correctness of an application such that, for example, a column in the dataset entity providing the source of data for a widget will always exist irrespective of whatever changes the system is subjected to.

The architecture of the present invention can be extended to provide further functionality. In an information system, such extended functionality may include specialized widgets or an e-mail module which can be plugged in. If extensions are present then these operate in the same way that shipped features operate.

A possible specialized widget that might be plugged in might be one that provides the display of measurements in feet and inches and we might call this specialized widget type FeetInch. To integrate this widget into the proposed architecture five steps need to be performed.

The first step is to make the FeetInch widget available to any applicable user-interface program because only the user-interface is able to display widgets.

This generally means making the code in which the widget is defined into a dynamically linked library that the user-interface program can load. The second step is to create a table in the database similar to that shown in FIG. 37 which provides a foreign key to the table SYS_WIDGET and lists all customizable properties as fields of a data type appropriate to hold the value and a foreign key field to SYS_EVENT_INSTANCE for each of the customizable events. The third stage is to add entries to SYS_EVENT_DECLARATION and SYS_EVENT_PARAMETER, as illustrated in FIG. 17, to define the number and order of parameters that each customizable event comprises. The fourth stage is to add a record into table SYS_WIDGET_TYPE which provides a user-friendly name and icon for the widget and the path to the dynamically linked library in which the class is defined as well as the name of the class in the dynamically linked library as illustrated in FIG. 36. The fifth and final task is to load into the rule structures all the rules required to enforce integrity of the FeetInch widget's data. As explained above, extensions are integrated consistently into the architecture of the present invention.

Until this point the description has only briefly mentioned content data and user-defined rules. The description will now explain the steps the user must take to add their own application table, user-defined data type, a form to edit their content data and a button to execute a custom script. While the linear order in which the description may be logical it is not proposed that this will necessarily be the sequence followed in the actual development of the information system which often follows a more iterative pattern.

As explained above, application structures are defined as structures which are specific to a type of information system. In a basic order entry system, which exhibits all the core features of an information system, the user might require application tables and fields to store product, customer, order and the individual order line data.

The first stage is to establish some application specific data types which do not exist in the database. Let us assume that the application requires a specialized data type, not currently available in the database, to store part number data. This new data type shall have name "Part_Number" and the caption "Part Number".

To create the new data types, the user must issue DDL commands to the database for each new data type as shown in FIG. 45a. In Firebird, these statements will cause the database to add records to the meta data table RDB$FIELDS for each new data type as shown in FIG. 2c. As explained above, the present invention installs a trigger on table RDB$FIELDS such that an insert into RDB$FIELDS will cause the database to add a record to table SYS_DATA_TYPE, an update RDB$FIELDS will cause the database to update the related record in table SYS_DATA_TYPE and a delete from RDB$FIELDS will cause the database to delete the related record in table SYS_DATA_TYPE. The structure and contents of table SYS_DATA_TYPE is shown in FIG. 6.

The second stage is to create four tables which are specific to the application. Let us assume that the application requires a table to store products, another to store customers, another to store orders and a table to list the individual lines in an order. For each new table to be created, the user must issue a DDL command to the database, an example of which is shown in FIG. 46*a*. In Firebird, these statements will cause the database to add a record to the meta data table RDB$RELATIONS for each new table as shown in FIG. 2*a*. For each field added, a record will be added to the meta data table RDB$RELATION_FIELDS as shown in FIG. 2*b*. The structure and contents of table SYS_TABLE is shown in FIG. 4 and the structure and contents of table SYS_FIELD is shown in FIG. 5.

As explained above, the present invention installs a trigger on table RDB$RELATIONS such that an insert into RDB$RELATIONS will cause the database to add a record to table SYS_TABLE, an update RDB$RELATIONS will cause the database to update the related record in table SYS_TABLE and a delete from RDB$RELATIONS will cause the database to delete the related record in table SYS_TABLE. Likewise, a trigger is installed on table RDB$RELATION_FIELDS such that an insert into RDB$RELATION_FIELDS will cause the database to add a record to table SYS_FIELD, an update RDB$RELATION_FIELDS will cause the database to update the related record in table SYS_FIELD and a delete from RDB$RELATION_FIELDS will cause the database to delete the related record in table SYS_FIELD.

For each table created, a trigger must be installed for each of the events that the database makes available. In the case of Firebird, six events are available. These are BEFORE_INSERT, AFTER_INSERT, BEFORE_UPDATE, AFTER_UPDATE, BEFORE_DELETE and AFTER_DELETE which are executed whenever records are inserted, updated and deleted from tables. Code is added to each trigger to call the proposed rule interpreter with the type of event, the sender of the event and the identity of the transaction. An example is illustrated in FIG. 47.

The next stage is to change the field SYS_CAPTION in table SYS_DATA_TYPE to a user-friendly name if required using a DML, data manipulation language, commands for each new data type as shown in FIG. 45*b*. The user-friendly names of tables can be changed by updating the value of field SYS_CAPTION in table SYS_TABLE using a DML command for each new table as shown in FIG. 46*b*. Likewise, the user-friendly names of fields can be changed by updating the value of field SYS_CAPTION in table SYS_FIELD using a DML command as shown in FIG. 46*c*.

Figure 48:
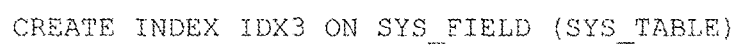

Indexes must be added using DDL statements as shown in FIG. 48. As explained above, the present invention installs a trigger on table RDB$INDICES and RDB$INDEX_SEGMENTS such that an insert into, update on or delete from RDB$INDICES and RDB$INDEX_SEGMENTS will cause the database to update the related record to table SYS_FIELD by setting the values of fields SYS_ASC_INDEX and SYS_DESC_INDEX.

Relationships between tables can be implemented by updating the appropriate rule structures as illustrated in FIGS. 16, 17, 18 and 19. Validation rules on fields can similarly be implemented by updating the appropriate rule structures as illustrated in FIGS. 16, 17, 18 and 19.

If a default widget type needs to be assigned to each new field listed in table SYS_FIELD then the foreign key SYS_WIDGET_TYPE can be edited and a value which exists as the primary key of table SYS_WIDGET_TYPE entered into the field.

The next series of steps will provide the application with a form with which to edit the content data and a button to automate some application-specific process. However, before the form can be defined some data sets and a data source will need to be established.

The manner in which data sets are defined in the architecture of the present invention has been discussed earlier and illustrated in FIG. 33. Creating a new data set is a matter of manipulating those data set structures with DML commands. Data sources, on the other hand, have not been explained.

Figure 49:
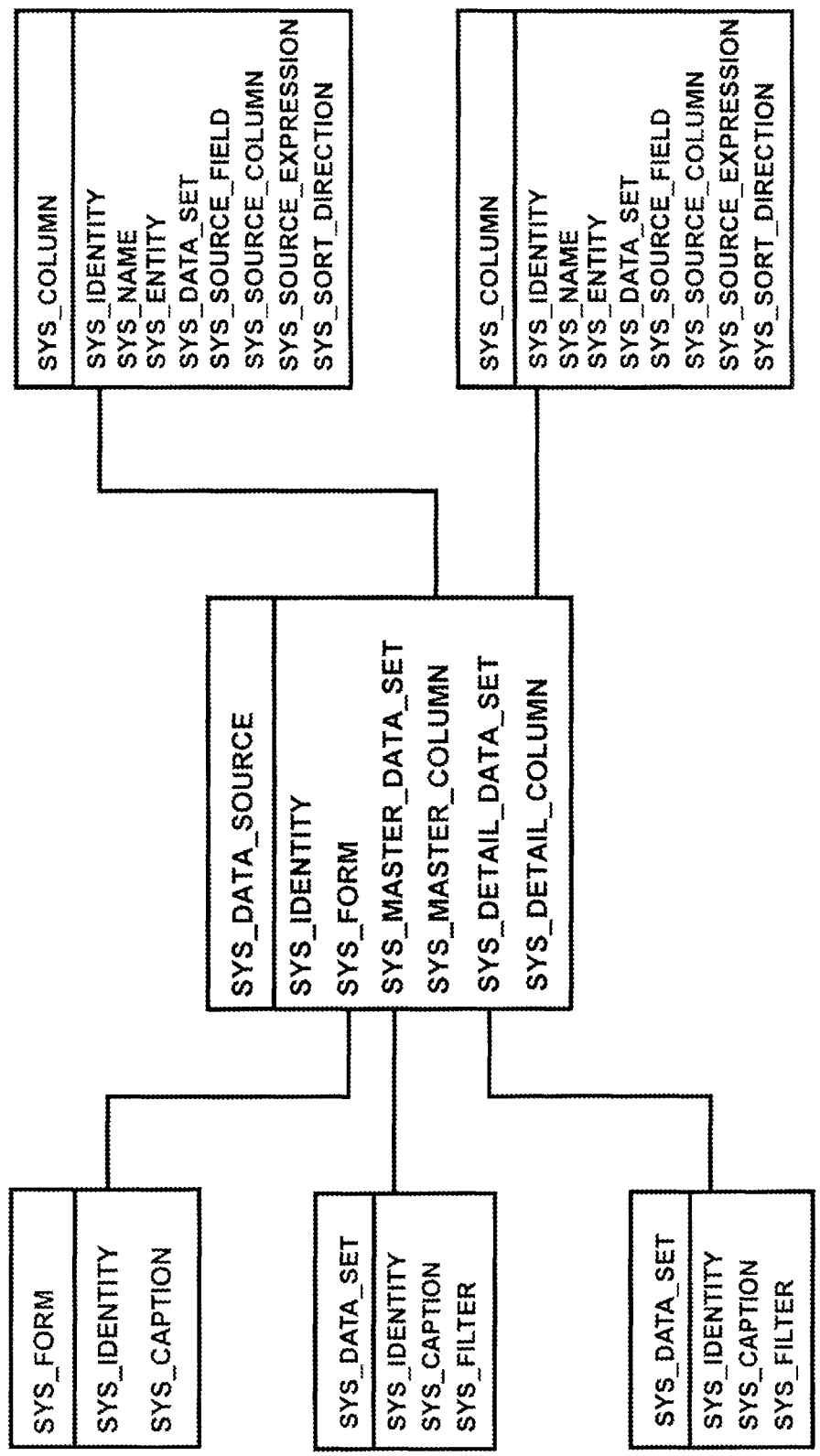
FIG. 49 illustrates the data structure, SYS_DATA_SOURCE.

A data source is used to combine multiple data sets to display on one form in a master-detail arrangement. The structure of table SYS_DATA_SOURCE is illustrated in FIG. 49. Table SYS_DATA_SOURCE has a foreign key field, SYS_MASTER_DATA_SET and another foreign key field, SYS_DETAIL_DATA_SET, which references data sets listed in SYS_DATA_SET. Field SYS_MASTER_COLUMN and SYS_DETAIL_COLUMN are foreign keys which reference columns in SYS_COLUMN. A rule ensures that the column referenced in SYS_MASTER_COLUMN is a member of the data set referenced in SYS_MASTER_SET and that the column referenced in SYS_DETAIL_COLUMN is a member of the data set referenced in SYS_DETAIL_SET. Table SYS_DATA_SOURCE also has a foreign key field, SYS_FORM, which references a form listed in SYS_FORM and which determines which form a data source is the source of data for. Consistent with the present invention if a data set is deleted from table SYS_DATA_SET referential integrity rules will ensure that the data set reference in SYS_DATA_SOURCE is also deleted. If a form is deleted from SYS_FORM referential integrity rules will ensure that all the records in SYS_DATA_SOURCE referencing that form are also deleted.

Taking the example of a basic order entry system, four data sets may be defined with each data set loading all the fields from the four application tables with captions "Customer", "Products", "Order" and "Order Lines". The data source may be a combination of these tables organized into a master-detail arrangement. This can be visualized in FIG. 31.

To create the form, the user inserts a record into table SYS_FORM with a caption like "Customer Orders". For each widget to appear on the form the user must add a record to the table SYS_WIDGET and add corresponding entries to the tables for each widget type, as shown in FIG. 37. If the widget is designed to display data from the database then the field SYS_COLUMN in table SYS_WIDGET must specify a column in the form's data source which provides the data. If the widget is a non-data widget like a push button then the field SYS_COLUMN can be set to 0. As described above, SYS_FORM_WIDGET must be completed with the list of widgets to appear on the form.

Validation rules assigned to fields in the database in table SYS_FIELD, field SYS_ON_VALIDATE are also executable on the client. The initiation rules assigned to fields in the database in table SYS_FIELD, field SYS_ON_INITIATE are valid only on a user-interface and provide what is commonly known as a default value and, like validation rules, are executable on the user-interface.

For widgets like a push button which is not a field editor "on click" event rules must be defined in the table SYS_PUSHBUTTON, field SYS_ON_CLICK as described above. If the push button is to appear as a widget on the form, in a menu and on a toolbar then tables SYS_FORM_WIDGET, SYS_MENU_WIDGET and SYS_TOOL_WIDGET must be completed as described above.

In the present invention, the user executes the user-interface program with the architecture as shown in FIG. 51 and connects to a database with the architecture also shown in FIG. 51. On connection to the database, the client or user-interface programs loads the customizable properties, events and scripts from the database and with classes in the clients or user-interfaces generates object instances with those properties thereby constructing the application in the knowledge that the application is assured of correctness. It is not relevant whether the customizable properties, events and scripts need be loaded in their entirety immediately on connecting to the database or whether the customizable properties, events and scripts should be loaded from the database as they are needed.

The reader might have noticed that while the architecture of the present invention maintains the integrity of the system and ensures the correctness of the application, heavy demands are placed on the user in terms of executing valid DDL and DML statements. The description will now address the issue of making the initial development and later adaptation of the application simple, quick and error-free using so called "drag and drop" and "point and select" user-interfaces.

FIGS. 50a, 50b, 50c, 50d, 50e and 50f show a selection of various "drag and drop" and "point and select" editors so that the reader understands what the present invention is referring to. FIG. 50a illustrates an editor for adding, deleting and changing fields in tables with the drop-down to select the data type; FIG. 50b illustrates a form and toolbar builder which allows a user to add widgets to a form, menu and toolbar by dragging and dropping widgets onto the form, menu and Toolbar; FIG. 50c illustrates a property editor which allows users to update custom properties of widgets in the user-interface; FIG. 50d illustrates a data set builder which allows columns to be selected for an entity and a set of filters to be defined;

FIG. 50e illustrates a dialog to define relationship rules between tables; and FIG. 50f illustrates a custom function builder where drop-downs exist to select constituent parts of the rule thereby ensuring that the definition of rules is error-free.

FIG. 50f demonstrates a clear example of "point and select" which not only accelerates initial development and later adaptation of the system but also eliminates any possibility of the user entering invalid data because the function builder only lists options which are computationally compatible which was an issue illustrated in FIG. 20 and FIG. 21 above. Such checks are possible because the same rules that enforce the integrity on the database are loaded into the user-interfaces and clients, as shown in FIG. 10 above, to pre-validate the data before being sent across the network to the database where the data is re-validated before finally committing the data.

The traditional architecture of information systems was illustrated in FIG. 1 and makes the initial development and later adaptation of information systems time-consuming and error-prone because it does not make it easy to identify dependencies or to conclusively verify the correctness of an application except by testing every possible combination of behaviour at run-time. That traditional design was methodically re-architected one step at a time until the architecture proposed by the present invention is revealed in FIG. 51. This new architecture not only accelerates the initial development and later adaptation of information systems but also removes any possibility for error, makes dependencies easy to determine and provides within its design the ability to conclusively verify the correctness of an application without having to test every possible combination of behaviour at run-time.

The invention claimed is:

1. An information system comprising:
   a database; and
   one or more user interface or client programs, wherein:
   a framework in the database is adapted to store as data, alongside content data: (i) system structures and application structures; and (ii) system data, application data and rule data that represent the structure of the information system and that include definitions of the user interface or client programs as well as definitions of rules as rule data;
   a framework in a user interface or client program is adapted to load the system data, application data and rule data from the database into an object with rules in the user interface or client program, thereby defining an application;
   the database is operable to perform validations to maintain the integrity of system data, application data and rule data, by using triggers and/or stored procedures, the database being operable to perform the validations prior to storage on the database of the system data, application data and rule data; and
   wherein the rules in the user-interface or client program, and the validations performed by the database, ensure that the integrity of the system is maintained during each step of development or during operation, without having to test every combination of behavior at run-time.

2. An information system as claimed in claim 1, where validations of the system data, application data and rule data can be performed at the client, in a middleware application through which data is passed between the user interface or client program and the database, on the database, or any combination of these before the information is committed to the database.

3. An information system as claimed in claim 1, where rule data, which is executed by the database and the user interface or client program calls the same dynamically loaded function libraries.

4. An information system as claimed in claim 1 where the user interface or client program permits only references to existing objects and options which are computationally compatible, as defined in the data, thus maintaining the integrity of the system during each stage of development.

5. An information system in accordance with claim 1, wherein the framework in the database is adapted to further include the step of:
   (i) storing alongside content data, the constituent parts of a rule;
   (ii) decomposing and storing rules as data in the database, and applying integrity checking to each part of the rules;
   and wherein:
   (iii) the database comprises a set of data structures to store the rule data, the data structures comprising tables and fields; and
   (iv) the framework in the user interface or client program comprises classes designed to load the rule data from the database, and execute the rules in the client or user-interface programs.

6. An information system in accordance with claim 5, wherein:
   the database is a relational database.

7. An information system in accordance with claim 1, wherein:
   classes in the user interface or client program correspond to tables in the database; and
   the user interface or client program loads application-specific logic stored in the database, when the user interface or client program connects to the database.

8. An information system in accordance with claim 1, wherein:
   the database comprises a set of data structures to store the customizable properties of widgets, forms, menu and toolbars, the data structures comprising tables and fields; and
   the framework in the user interface or client program comprises widget classes, form classes, menu classes and toolbar classes designed to load the customizable properties and create customized objects.

9. An information system in accordance with claim 1, wherein the framework in the database:
   (i) is adapted to store, alongside content data, the constituent parts of an SQL statement;
   (ii) comprises a set of data structures to store data sets, entities, columns, joins, and filters, the data structures comprising tables and fields; and there is a stored procedure in the database for assembling the constituent parts of the dataset and generating the SQL.

10. An information system in accordance with claim 1, wherein:
   the framework in the user interface or client program comprises a data set class designed to load the SQL statement, whereby the data set class in the user interface or client program loads the SQL by calling a stored procedure in the database.

* * * * *